(12) United States Patent  
Benedetti et al.

(10) Patent No.: US 11,724,885 B2  
(45) Date of Patent: Aug. 15, 2023

(54) CONVEYOR AND PACKAGING APPARATUS PROVIDED WITH SAID CONVEYOR

(71) Applicant: Cryovac, LLC, Charlotte, NC (US)

(72) Inventors: Giulio Benedetti, Solbiate Arno (IT); Haris Nazic, Rothenburg (CH)

(73) Assignee: Cryovac, LLC, Charlotte, NC (US)

( * ) Notice: Subject to any disclaimer, the term of this patent is extended or adjusted under 35 U.S.C. 154(b) by 193 days.

(21) Appl. No.: 17/440,829

(22) PCT Filed: Mar. 17, 2020

(86) PCT No.: PCT/EP2020/057301  
§ 371 (c)(1),  
(2) Date: Sep. 20, 2021

(87) PCT Pub. No.: WO2020/187914  
PCT Pub. Date: Sep. 24, 2020

(65) Prior Publication Data  
US 2022/0162007 A1    May 26, 2022

(30) Foreign Application Priority Data

Mar. 20, 2019  (EP) .................................. 19164137

(51) Int. Cl.  
*B65G 17/08* (2006.01)  
*B65B 7/28* (2006.01)  
(Continued)

(52) U.S. Cl.  
CPC ............ *B65G 17/08* (2013.01); *B65B 7/2878* (2013.01); *B65B 43/48* (2013.01); *B65G 17/48* (2013.01); *B65G 47/244* (2013.01)

(58) Field of Classification Search  
CPC ...... B65G 17/08; B65G 17/48; B65G 47/244; B65B 7/2878; B65B 43/48  
See application file for complete search history.

(56) References Cited

U.S. PATENT DOCUMENTS 3,750,815 A     8/1973   Haven  
5,317,859 A  *  6/1994   Schneider ............... B65B 5/106  
                                                        53/251  
(Continued)

FOREIGN PATENT DOCUMENTS

CN         103879765 A      6/2014  
CN         204473258 U      7/2015  
(Continued)

*Primary Examiner* — Mark A Deuble  
(74) *Attorney, Agent, or Firm* — Jason R. Womer

(57) ABSTRACT

A conveyor for a packaging apparatus comprising a conveyor having a conveyor belt (2) with a rotatable portion (12) comprising a plurality of sub-elements (17). Each one of the sub-elements (17) comprises first annular features and second annular features. The first annular features of a sub-element mate with the second annular features of an adjacent sub-element forming a coupling seat where a pin is inserted to rotatably connect the two adjacent sub-elements. The rotatable portion (12) carries driving pieces which are put into motion by a control mechanism such that upon displacement of the conveyor belt (2) a corresponding rotation by 90° or multiples thereof is imparted to the rotatable portion (12). A packaging apparatus using the above conveyor belt is also described.

20 Claims, 18 Drawing Sheets

(51) Int. Cl.
*B65B 43/48* (2006.01)
*B65G 17/48* (2006.01)
*B65G 47/244* (2006.01)

(56) References Cited

U.S. PATENT DOCUMENTS

| | | | |
|---|---|---|---|
| 6,520,314 | B1 | 2/2003 | Seiling |
| 6,571,937 | B1 * | 6/2003 | Costanzo ............... B65G 17/32 |
| | | | 198/779 |
| 7,097,029 | B2 * | 8/2006 | Halang ................ B65G 47/244 |
| | | | 198/623 |
| 2001/0045346 | A1 | 11/2001 | Costanzo |
| 2005/0023105 | A1 | 2/2005 | Costanzo et al. |
| 2005/0155846 | A1 | 7/2005 | Sofranec |
| 2007/0089970 | A1 | 4/2007 | Damkjaer |
| 2008/0302634 | A1 | 12/2008 | Costanzo et al. |
| 2009/0039592 | A1 | 2/2009 | Jans et al. |
| 2009/0194391 | A1 | 8/2009 | Lagneaux |
| 2012/0018280 | A1 * | 1/2012 | Hamao ................ B65G 47/244 |
| | | | 198/379 |
| 2015/0210483 | A1 | 7/2015 | Morency et al. |
| 2022/0169452 | A1 * | 6/2022 | Benedetti ............... B65B 7/164 |
| 2022/0267103 | A1 * | 8/2022 | Kuhn .................... B65G 23/04 |

FOREIGN PATENT DOCUMENTS

| | | |
|---|---|---|
| CN | 108357894 A | 8/2018 |
| EP | 2671823 A1 | 12/2013 |
| EP | 3106411 A1 | 12/2016 |
| GB | 2203402 A | 10/1988 |
| JP | 2005138918 A | 6/2005 |
| KR | 20090100944 A | 9/2009 |
| WO | 2014029855 A1 | 2/2014 |
| WO | 2016009170 A1 | 1/2016 |

* cited by examiner

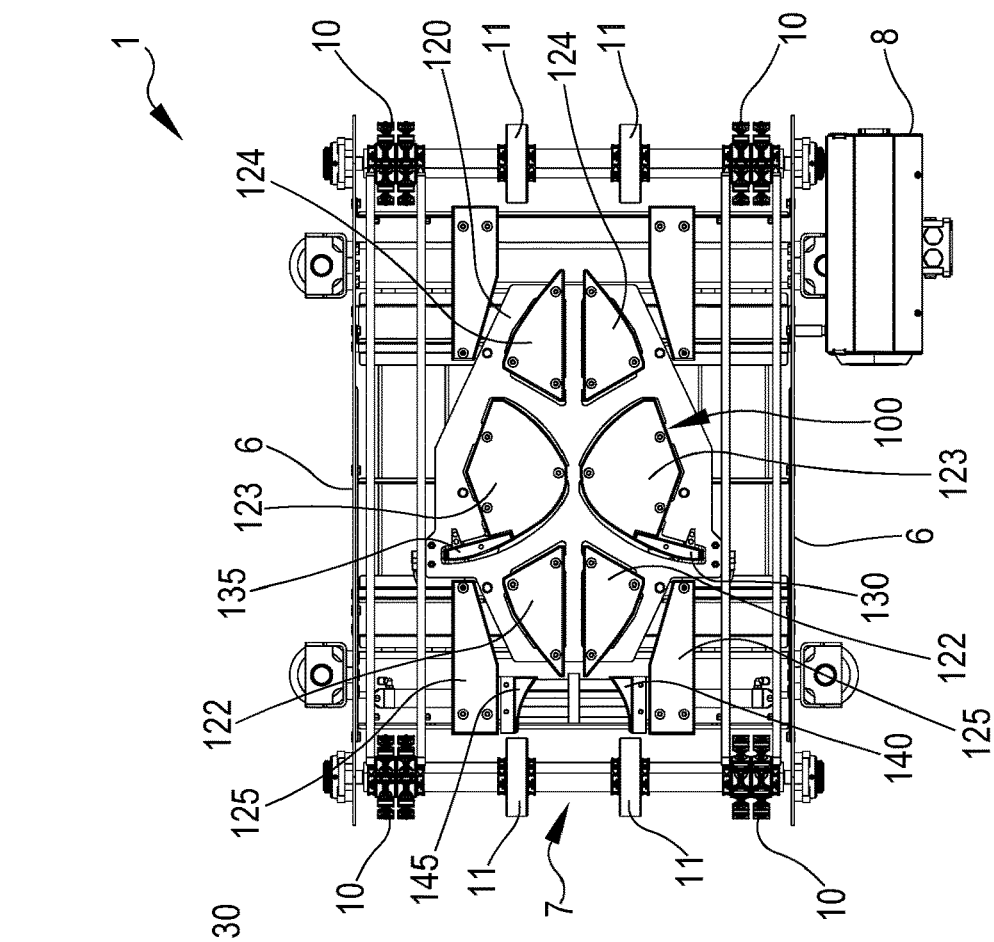

FIG.19C
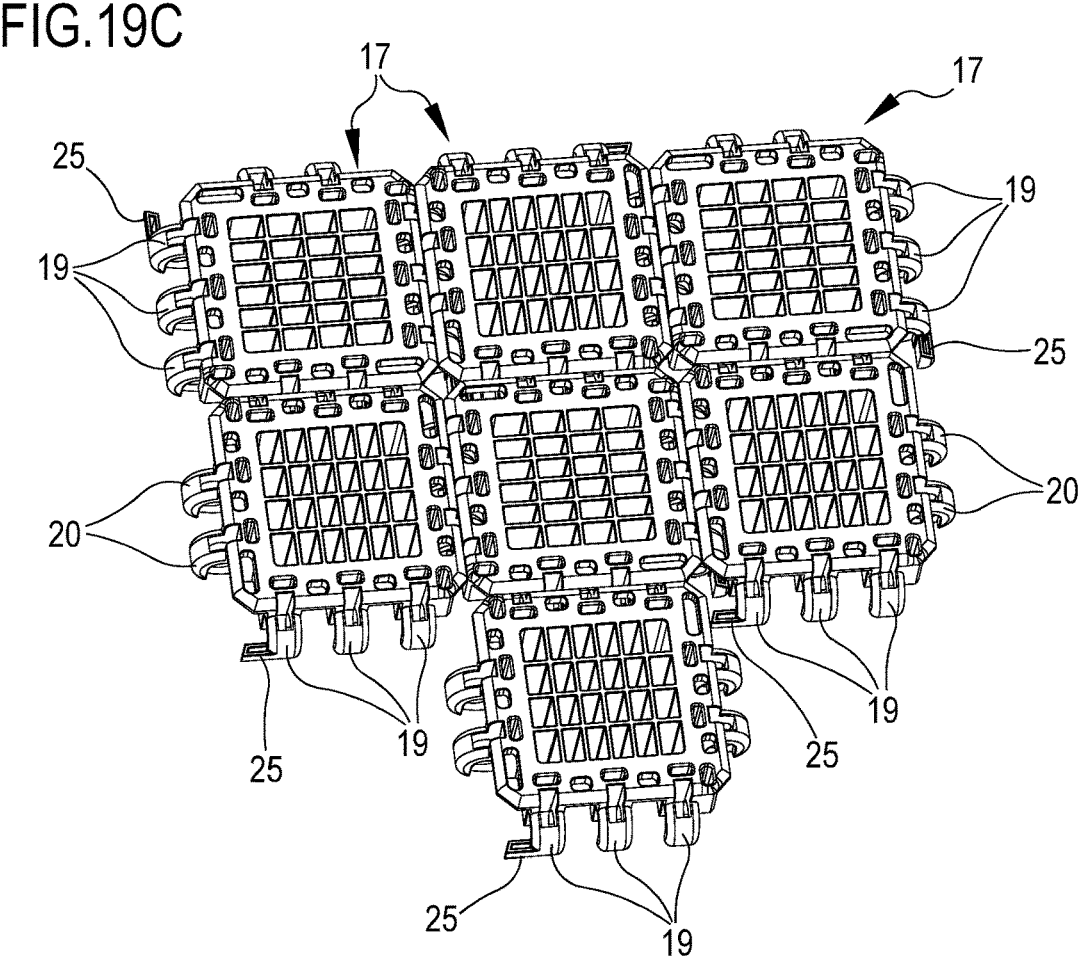
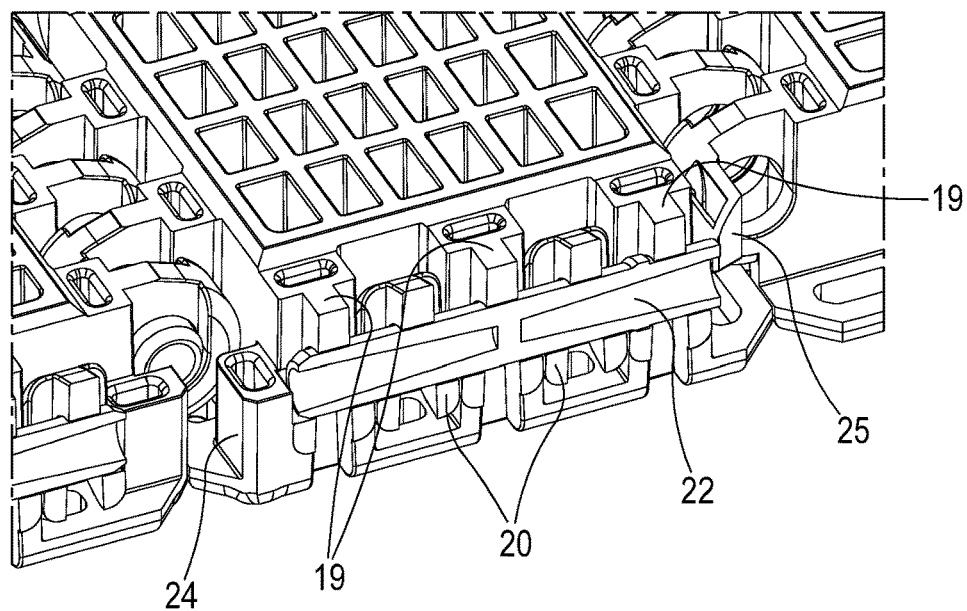
FIG.19D

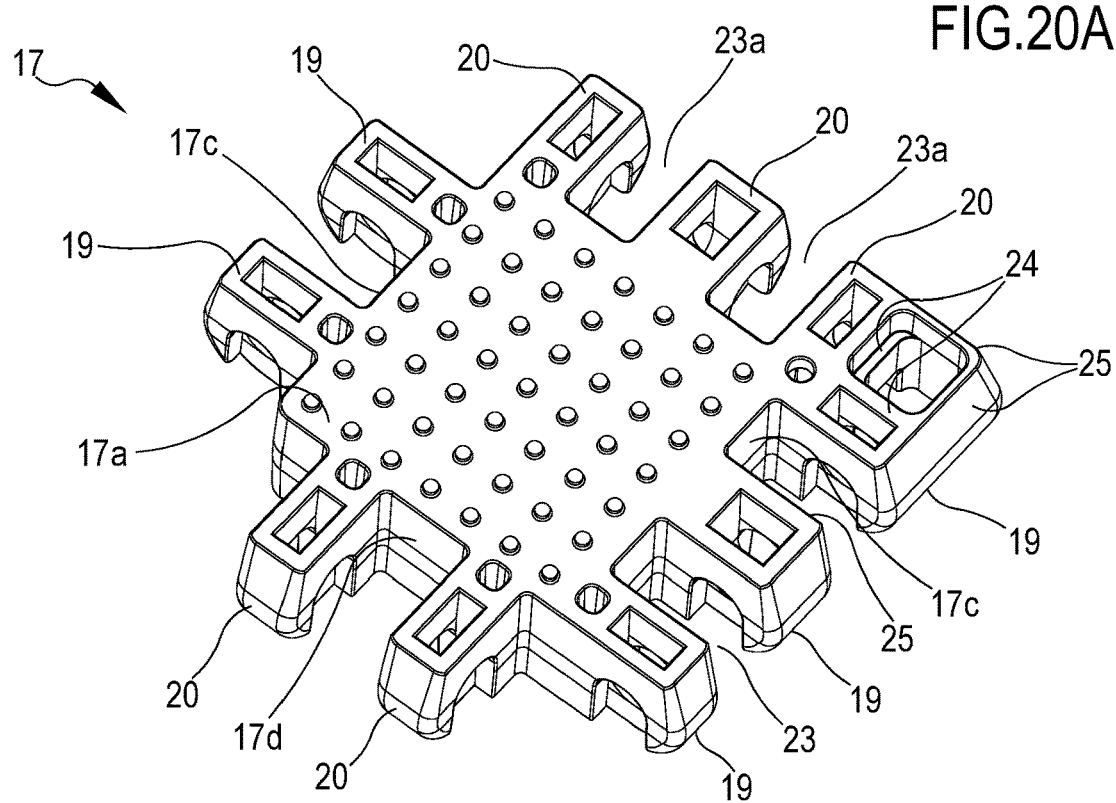
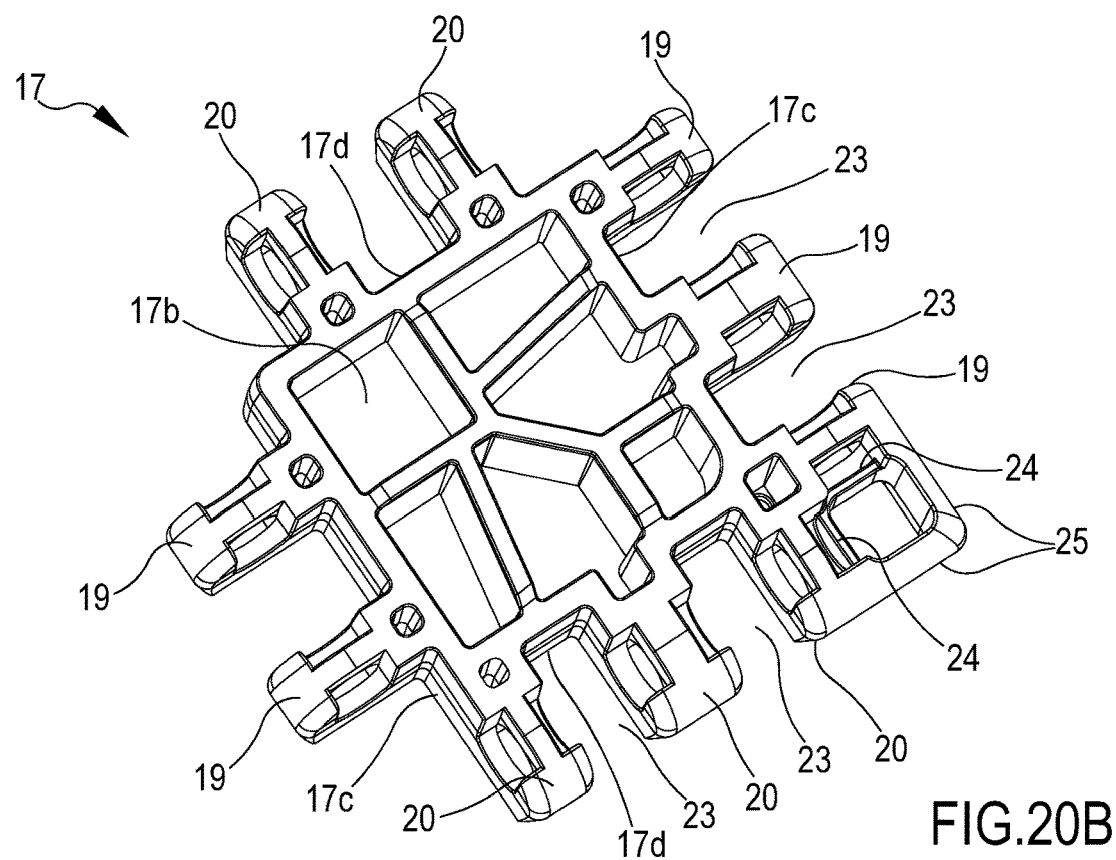

FIG.20E
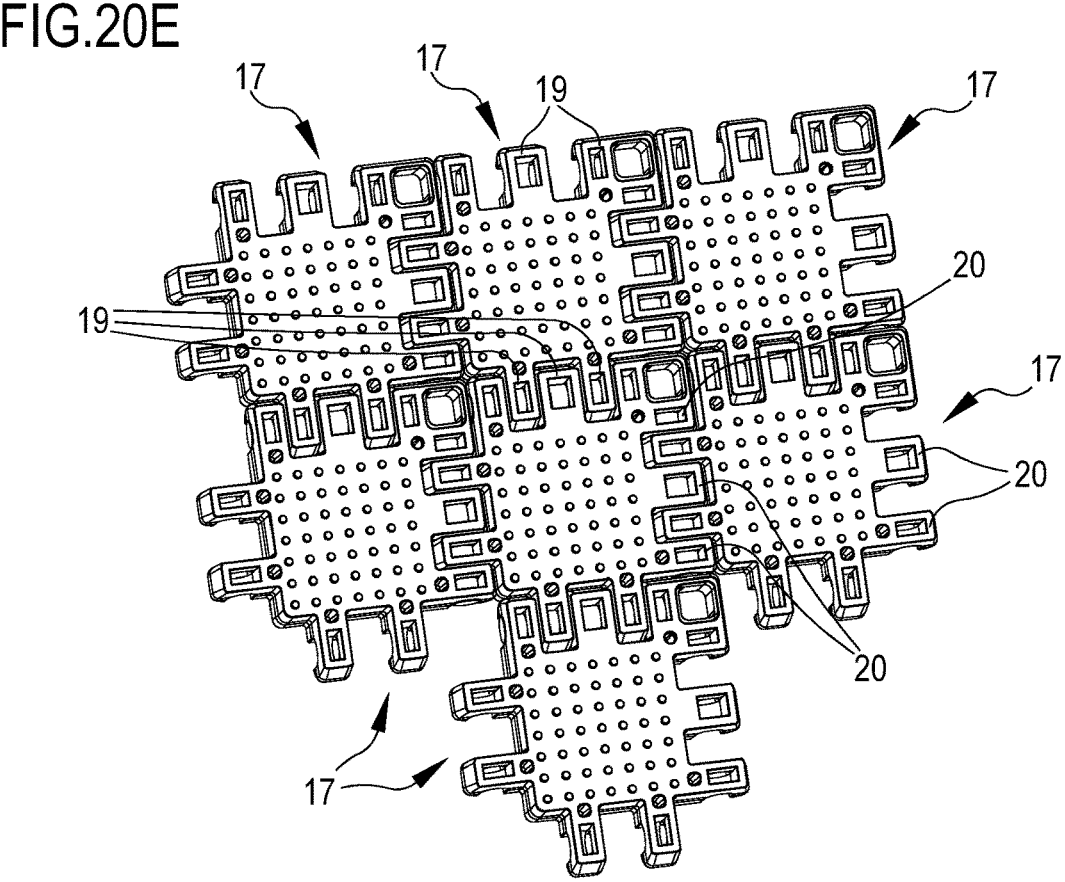
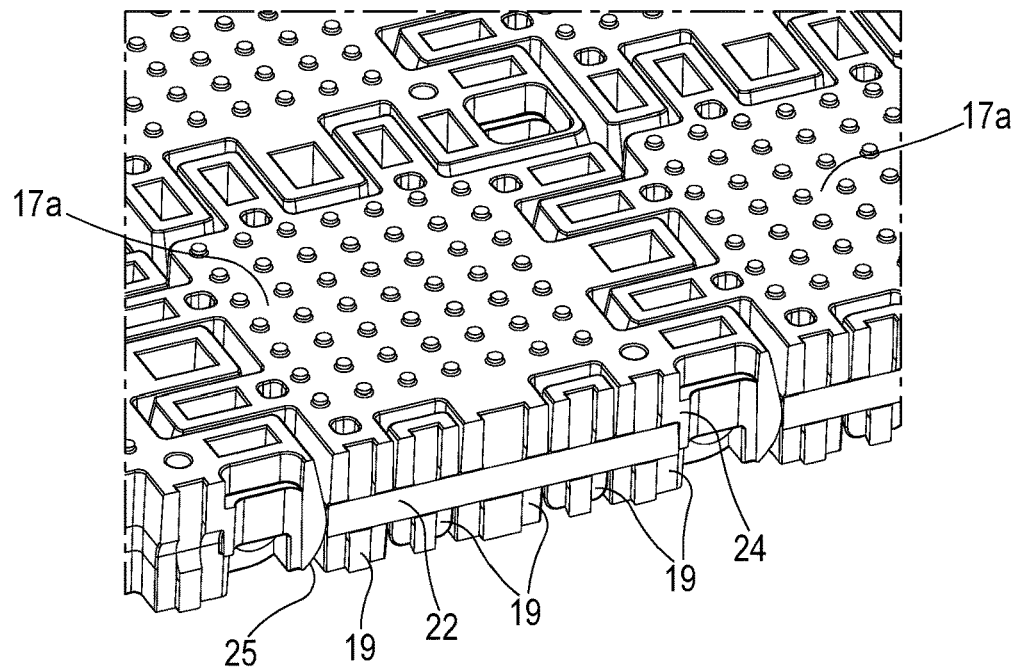
FIG.20F

CONVEYOR AND PACKAGING APPARATUS PROVIDED WITH SAID CONVEYOR

FIELD OF THE INVENTION

The present invention refers to a conveyor and to an apparatus for packaging products using the mentioned conveyor for transporting the product to be packaged and/or the packaged products along an operating path. The invention may find particular application in the transport and packaging of articles, such as for example vacuum packaging or a controlled atmosphere packaging of articles of various kinds, in particular food-type products.

BACKGROUND ART

Conveyors may be used to transfer a product from one position to another position. For example, in the field of packaging, a conveyor may be used to transport a product to a packaging machine and/or to transfer a packaged product out of the packaging machine. In some cases, in addition to conveying an article, it is desirable to reorient the article before, during or after packaging. US 2009/0039592 A1 discloses a product orienting apparatus that comprises a table comprising a rotatable device. The table also has an array of substantially identical spherical rollers, each spherical roller being suitable for contacting the product and the table surface. By rotation of the rotatable device, the product is rotated in the opposite direction on the conveyor belt. This is because the rotation of the rotatable device is translated into a rotation of the spherical rollers, which in turn is translated into a rotation of the product.

GB 2203402 A discloses an apparatus for transporting stacks of paper sheets in a production line in which an endless conveyor supports a set of equidistant flexible turntables. Successive turntables accept successive incoming stacks and turn them through 90° before the turned stacks are stripped off the respective turntables. U.S. Pat. No. 6,520,314 B1 discloses a patterning apparatus for advancing packaged baked goods such as loaves of bread, and positioning the packages for loading. The apparatus includes an endless conveyor having a horizontally disposed upper flight and a series of turner assemblies spaced along the conveyor. Each turner assembly receives one or more packages. The turner assemblies are adapted to rotate the received package while also achieving longitudinal conveyance, and lateral movement transversely to the longitudinal direction.

The above apparatuses have a relatively high possibility of malfunctioning. Other disadvantages are that such apparatuses can be very complex, difficult to be cleaned, unreliable, expensive to manufacture and cumbersome.

WO2014029855A1 discloses a conveyor belt with a rotatable portion integrated into the belt. The rotatable portion comprises a plurality of sub-elements, each of which forms part of a surface of the rotatable portion, such that the rotatable portion is bendable and may adapt to a non rectilinear path of the belt.

Although this last solution offers an efficient system for rotating a product, eliminating the need for an operator to rotate any of the packages manually, the applicant identified further areas of improvement.

OBJECT OF THE INVENTION

In particular, it is an aim of the present invention providing a conveyor with ability to rotate articles and yet characterized by a higher operation reliability.

A further object of the invention is that of providing a conveyor having modular rotatable portions which are easy to assemble and which ensure at the same time a stable connection among the sub-elements forming the rotatable portion.

An additional object is that of providing a conveyor provided with an actuation system designed for causing a controlled rotation of the rotatable portion, which is of compact design and yet able to rotate the rotatable parts without requiring high actuation forces.

SUMMARY

A $1^{st}$ aspect refers to a conveyor belt (2) comprising:
a belt body (13) configured to be positioned along a non-rectilinear path;
at least one rotatable portion (12) coupled to the belt body (13) and configured to turn relative to the belt body (13);
wherein the rotatable portion (12) comprises a plurality of sub-elements (17), with each one of said sub-elements being rotatably connected to an adjacent sub-element and having:
  a top face (17a),
  a bottom face (17b),
  first opposite side portions (17c) extending between the top and the bottom faces of each sub-element, and
  second opposite side portions (17d) extending between the top and the bottom faces of each sub-element,
each one of the sub-elements (17) further comprising:
  one or more first annular features (19) at each of the first opposite side portions (17c),
  one or more second annular features (20) at each the second opposite side portions (17d),
wherein the first annular features (19) of a sub-element mate with the first annular features (19) or with the second annular features (20) of an adjacent sub-element form a coupling seat (21) located between the two adjacent sub-elements and extending along an axis of rotation,
and
wherein at least one pin (22) is inserted in said coupling seat (21) formed between the two adjacent sub-elements to rotatably connect the two adjacent sub-elements (17).

In a 2nd aspect according to the preceding aspect each sub-element (17) comprises a plurality of first annular features (19) emerging from each one of the respective first side portions (17c) and a plurality of second annular features (20) emerging from each one of the respective second side portions (17d) of the same sub-element.

In a 3rd aspect according to any one of the preceding aspects each of said sub-elements (17) has four side portions defined by two first opposite side portions (17c) and by two opposite second side portions (17d), and wherein, for each of said sub-elements:
  the first annular features (19) emerging from a same first side portion (17c) are coaxially aligned along a respective axis of rotation, and
  the second annular features (20) emerging from a same second side portion (17d) are coaxially aligned along a respective axis of rotation.

In a 4th aspect according to one of the preceding aspects the second annular features (20) emerging from a same second side portion (17d) are perpendicular to the first annular features (19) emerging from an adjacent first side portion (17c).

In a 5th aspect according to any one of the preceding aspects each one of said sub-elements (17) comprises at least one lock protrusions (25) for at least one of said first and second side portions (17c, 17d), wherein said lock portion (25) extends parallel to at least one of said first and second side portion (17c, 17d).

In an 6th aspect of the preceding aspect said lock protrusions (25) extends parallel to an axis of rotation defined by the first or second annular features (19, 20).

In a 7th aspect according to any one of the preceding aspects each sub-element (17) of said plurality is coupled with at least one longitudinally adjacent sub-element and with at least one transversally adjacent sub-element.

In a 8th aspect according to any one of the preceding aspects each sub-element (17) comprises at least two axial stops (24), wherein each axial stop (24) defines an axial abutment for the pin (22) inserted in the coupling seat formed between two adjacent sub-elements (17).

In a 9th aspect according to the preceding aspect each axial stop (24) is structurally carried by one of the first annular features or by the first side portion or by a corner region of the sub element where one the first side portions meets one of the second side portions.

In a 10th aspect according to any one of the preceding aspects each sub-element (17) includes a four sided prismatic central body having a reticular structure.

In a 11th aspect according to the preceding aspect the central body has a multiplicity of through passages that put in fluid communication the bottom face (17b) and the top face (17a) of the sub-element (17).

In a 12th aspect according to any one of the preceding aspects the first annular features (19) of a sub-element mate with the second annular features (20) of an adjacent sub-element forming a coupling seat (21) located between the two adjacent sub-elements and extending along an axis of rotation.

In a 13th aspect according to any one of the preceding aspects in each one of said sub-elements:
the first annular features (19) emerging from each first side portion (17c) are one more in number of the second annular features (20) emerging from each second side portion (17d),
the first annular features (19) emerging from each first side portion (17c) are equal in number to the first annular features (19) emerging from the opposite first side portion (17c),
the second annular features (20) emerging from each second side portion (17d) are equal in number to the second annular features (20) emerging from the opposite second side portion (17d).

In a 14th aspect according to any one of the preceding aspects, wherein each one of said sub-elements (17) comprises two lock protrusions (25), one for each one of said first opposite side portions (17c), wherein each lock protrusion (25) extends parallel to the respective first side portion (17c) and according to a direction opposite to that of the other lock protrusion (25) of the same sub-element (17).

In a 15th aspect of the preceding aspect each one of said protrusions (25) extends parallel to an axis of rotation defined by the first annular features (19) of a same side portion.

In a 16th aspect according the 14th or 15th aspect in each one of said sub-elements (17):
the first annular features (19) emerging from one first side portion (17c) comprise a terminal first annular feature which carries one respective lock protrusion (25) extending transversally to said terminal first annular feature and away from the first annular features of the same first side portion,
the first annular features (19) emerging from the opposite first side portion (17c) comprise another terminal first annular feature which carries one respective protrusion (25) extending transversally to said terminal first annular feature of the opposite first side portion and away from first annular features of the same first side portion,
wherein said lock protrusions (25) extend substantially parallel to each other and in opposite directions from the respective terminal first annular feature.

In a 17th aspect according to any one of the preceding aspects each sub-element (17) of said plurality is coupled to at least two adjacent sub-elements either according to a first coupling mode or according to a second coupling mode;
wherein if the sub-element is in the first coupling mode, then said sub-element:
is coupled with a longitudinally adjacent sub-element, with first annular features (19) of the sub-element mating with second annular features (20) of the longitudinally adjacent sub-element forming one transverse coupling seat extending between the sub-element and the longitudinally adjacent sub-element,
is coupled with a transversally adjacent sub-element, with second annular features (20) of the sub-element mating with first annular features (19) of the transversally adjacent sub-element forming one longitudinal coupling seat extending between the sub-element and the transversally adjacent sub-element;
or if the sub-element is in the second coupling mode, then said sub-element:
is coupled with a longitudinally adjacent sub-element, with second annular features (20) of the sub-element mating with first annular features (19) of the longitudinally adjacent sub-element forming one transverse coupling seat extending between the sub-element and the longitudinally adjacent sub-element,
is coupled with a transversally adjacent sub-element, with first annular features (19) of the sub-element mating with second annular features (20) of the transversally adjacent sub-element forming one longitudinal coupling seat extending between the sub-element and the transversally adjacent sub-element.

In a 18th aspect according to the preceding aspect said at least one pin (22) comprises at least one transverse pin inserted in each one of said transverse coupling seats and at least one longitudinal pin inserted in each one of said longitudinal coupling seats.

In a 19th aspect according to the aspect 17th or 18th the conveyor belt comprises a plurality of sub-elements in the first coupling mode and a plurality of sub-elements in the second coupling mode, wherein the sub-elements in the first coupling mode are longitudinally and transversally alternated by a sub-elements in the second coupling mode.

In a 20th aspect according to the aspect 17th or 18th or 19th longitudinally aligned sub-elements form lines of sub-elements presenting coaxial longitudinal coupling seats and transversally aligned sub-elements form rows of sub-elements presenting coaxial transversal coupling seats, such that the rotatable portion (12) is capable of bending and follow the non-linear path of the belt body.

In a 21st aspect according to any one of the preceding aspects from the 17th to the 20th each given sub-element (17) of the plurality of sub-elements positioned in the first coupling mode has:
one of its lock protrusions (25) acting as an axial lock against extraction of the pin (22) inserted in the coupling seat (21) defined between a further sub-element, longitudinally adjacent to the given sub-element, and an additional sub-element transversally adjacent to the further-sub-element, and/or each given sub-element (17) of the plurality of sub-elements positioned in the second coupling mode having:
one of its lock protrusions (25) acting as an axial lock against extraction of the pin (22) inserted in the coupling seat defined between a further sub-element, transversally adjacent to the given sub-element, and an additional sub-element longitudinally adjacent to the further-sub-element.

In a 22nd aspect according to the preceding aspect said one lock protrusion (25) of each given sub-element (17) positioned in the first coupling mode is configured to act as axial lock against extraction of the pin (22) only when the given sub-element and the longitudinally adjacent sub-element are coplanar or inclined the one with respect to the other of a prefixed acute angle, while allowing extraction of the pin (22) when the given sub-element and the longitudinally adjacent sub-element are inclined the one with respect to the other of an angle greater than said prefixed acute angle, and/or said one lock protrusion (25) of each given sub-element positioned in the second coupling mode is configured to act as axial lock against extraction of the pin (22) only when the given sub-element and the transversally adjacent sub-element are coplanar or inclined the one with respect to the other of a prefixed acute angle, while allowing extraction of the pin (22) when the given sub-element and the transversally adjacent sub-element are inclined the one with respect to the other of an angle greater than said prefixed acute angle.

In a 23rd aspect according to any one of the preceding aspects from the 12th to the 22th each one of said sub-elements (17) has centrally symmetric structure, optionally all sub-elements (17) of said plurality of sub elements are structurally identical.

In a 24th aspect according to any one of the preceding aspects from the 1st to the 11th, the first annular features (19) of a sub-element mate with the first annular features (19) of an adjacent sub-element forming a coupling seat (21) located between the two adjacent sub-elements and extending along an axis of rotation, and the second annular features (20) of a sub-element mate with the second annular features (20) of an adjacent sub-element forming a coupling seat (21) located between the two adjacent sub-elements and extending along an axis of rotation.

In a 25th aspect according to the preceding aspect in each one of said sub-elements:
the first annular features (19) emerging from one first side portion (17c) are one more in number of the first annular features (19) emerging from the opposite first side portion (17c),
the second annular features (20) emerging from one second side portion (17d) are one more in number of the second annular features (20) emerging from the other opposite second side portion (17d).

In a 26th aspect according to the preceding aspect the first annular features (19) emerging from one first side portion (17c) are equal in number to the second annular features (20) emerging from one adjacent second side portion (17d).

In a 27th aspect according to any one of the preceding aspects from the 1st to the 11th, wherein each one of said sub-elements (17) comprises two lock protrusions (25), one for one first side portion (17c) and one for one adjacent second side portion (17d), wherein each lock protrusion (25) extends parallel to the respective first and second side portion (17c, 17d) and according to a direction intersecting that of the other lock protrusion (25) of the same sub-element (17).

In a 28th aspect according to the preceding aspect the lock protrusion (25) of the first side portion (17c) extends parallel to an axis of rotation defined by the first annular features (19), while the lock protrusion (25) of the second side portion (17d) extends parallel to an axis of rotation defined by the second annular features (20).

In a 29th aspect according to the 27th or 28th aspect wherein in each one of said sub-elements (17):
the first annular features (19) emerging from one of said opposite first side portion (17c) comprise a terminal first annular feature which carries the respective lock protrusion (25) extending transversally to said terminal first annular feature and away from the first annular features of the same first side portion,
the second annular features (20) emerging from one of said opposite second side portion (17d), adjacent with the first side portion (17c) carrying the first annular features (19), comprise a terminal second annular feature which carries one respective lock protrusion (25) extending transversally to said terminal second annular feature and away from second annular features of the same first side portion,
wherein said lock protrusions (25) extend transversally, optionally perpendicular, to each other and in intersecting directions from the respective terminal first and second annular feature.

In a 30th aspect according to any one of aspects from the 27th to the 30th said two lock protrusions (25) join together forming a single piece placed at the corner of two adjacent first and second side portions.

In a 31st aspect according to any one of the preceding aspects each sub-element (17) of said plurality is coupled to at least one adjacent sub-elements in a single coupling mode wherein said plurality of sub-elements presents the same orientation.

In a 32nd aspect according to any one of the aspects from the 24th to the 31st wherein the conveyor belt comprises:
a plurality of sub-elements longitudinally aligned in order to form lines of sub-elements presenting coaxial longitudinal coupling seats, and
a plurality of sub-elements transversally aligned in order to form rows of sub-elements presenting coaxial transversal coupling seats,
the rotatable portion (12) being capable of bending and follow the non-linear path of the belt body.

In a 33rd aspect according to any one of the preceding aspects from the 24th to the 32nd each given sub-element (17) of the plurality of sub-elements has:
one lock protrusions (25) acting as an axial lock against extraction of the pin (22) inserted in the coupling seat (21) defined between a longitudinally adjacent sub-element, and
one lock protrusions (25) acting as an axial lock against extraction of the pin (22) inserted in the coupling seat (21) defined between a transversally adjacent sub-element.

In a 34th aspect according to the preceding aspect each lock protrusions (25) of each given sub-element (17) is configured to act as axial lock against extraction of the respective pin (22) only when the given sub-element and the adjacent sub-element are coplanar or inclined the one with respect to the other of a prefixed acute angle, while allowing extraction of the pin (22) when the given sub-element and the adjacent sub-element are inclined the one with respect to the other of an angle greater than said prefixed acute angle.

In a 35th aspect according to any one of the preceding aspects from the 24th to the 34th each one of said sub-elements (17) has diagonal symmetric structure, in particular wherein all sub-elements (17) of said plurality of sub elements are structurally identical.

In a 36th aspect according to any one of the preceding aspects each rotatable portion (12) comprises a plurality of perimeter bodies (18) defining a peripheral edge of the rotatable portion (12) encircling the plurality of interconnected sub-elements (17).

In a 37th aspect according to the preceding aspect each one of said perimeter bodies (18) is connected with at least one of said sub-elements (17) and presents a radially external side of curved shape, and wherein the perimeter bodies (18) are positioned in side by side relationship and provide the rotatable portion (12) with a peripheral edge of circular shape.

In a 38th aspect according to any one of the preceding aspects the belt body (13) and the rotatable portion (12) have a respective top surface (14, 15) configured to receive articles to be conveyed, and the top surface (15) of the rotatable portion (12) positions in alignment with the top surface (14) of the belt body (13).

In a 39th aspect according to any one of the preceding aspects the belt body (13) has an aperture (16) configured for receiving the rotatable portion (12), the belt body aperture is shaped as the peripheral edge of the rotatable portion (12), and the rotatable portion (12) is rotatable about an axis perpendicular to a top surface (14) of the belt body (13).

In a 40th aspect according to any one of the preceding aspects the rotatable portion (12) comprises one or more driving pieces (26) emerging from a bottom side of the rotatable portion (12), said driving pieces (26) being optionally carried by perimeter bodies (18) of the rotatable portion (12).

In a 41st aspect a conveyor (1) is provided comprising:
a conveyor belt (2) according to positioned according to a closed path thereby forming an endless conveyor belt,
at least one drive roller engaging an inner side of the conveyor belt (2), wherein the conveyor belt (2) and the rotatable portion (12) are bendable around the drive roller.

In a 42nd aspect the conveyor according to the preceding aspect uses the conveyor belt (2) of aspect 40th, wherein the conveyor (1) further comprises a control mechanism (100) configured to act on said one or more driving pieces (26) and, following a displacement of the conveyor belt body along said predetermined path, cause a rotation of the rotatable portion (12) by 90° or multiples thereof.

In a 43rd aspect a conveyor (1) is provided comprising:
a support frame (3),
a conveyor belt (2), carried by the support frame (3), configured to move at least one article (P) along an advancement direction (A) on a planar operative tract (2a), said conveyor belt (2) comprising:
a belt body (13),
at least one rotatable portion (12) coupled to the belt body (13) and configured to turn relative to the belt body (13),
wherein the rotatable portion (12) has a top surface (15) configured to receive said article (P), the rotatable portion (12), during the movement of the article (P) along the advancement direction (A), being configured to turn relative to the belt body (13) at least between two angularly offset positions,
wherein the rotatable portion (12) comprises at least one driving piece (26) emerging from a bottom surface (55) of the rotatable portion (12) opposite to said top surface (15),
a control mechanism (100) carried by the support frame (3), the control mechanism being configured to act on said driving piece (26) and, following a displacement of the belt body (13) along said advancement direction (A), cause a rotation of the rotatable portion (12) between said two angularly offset positions.

In a 44th aspect according to the preceding aspect the control mechanism (100) comprises at least one guide (101) developing on a plane parallel to the operative tract (2a) of the conveyor belt (2) and extending along a predetermined operative path, said guide (101) being configured to drive the driving piece (26) along the predetermined operative path during displacement of the belt body (13) along said advancement direction (A), causing the rotation of the article (P).

In a 45th aspect according to the 43rd or 44th aspect the guide (101) exhibits a transverse extension ($101_T$), measured along a direction perpendicular to the advancement direction (A), greater than 0.75 of a longitudinal extension ($101_L$) of the same guide measured parallel to the advancement direction (A).

In a 46th aspect according to the preceding aspect the ratio between the transversal extension ($101_T$) and the longitudinal extension ($101_L$) of the guide (101) is equal to or greater than 1.1, optionally comprised between 1.1 and 2, more optionally comprised between 1.1 and 1.5.

In a 47th aspect according to any one of the preceding aspects from the 43rd to the 46th the guide (101) of the control mechanism (100) is configured to act on said driving piece (26) and, following a predetermined displacement of the belt body (13) along said advancement direction (A), cause a rotation of the rotatable portion (12) by 90° or multiples thereof.

In a 48th aspect according to any one of the preceding aspects from the 43rd to the 47th the rotatable portion (12) exhibits a predetermined transversal size measured perpendicularly to the advancement direction (A), wherein the transversal extension ($101_T$) of the guide (101) is substantially half the predetermined transversal size of the rotatable portion (12).

In a 49th aspect according to the preceding aspect the ratio between the longitudinal extension ($101_L$) of the guide (101) and the transversal size of the rotatable portion (12) is less than 0.6, optionally is less than 0.5, more optionally is comprised between 0.4 and 0.2.

In a 50th aspect according to any one of the preceding aspects from the 43rd to the 49th wherein the operative path of the guide (101) exhibits, for at least of a tract of the path, a curved profile, optionally defines a parabolic curve.

In a 51st aspect according to any one of the preceding aspects from the 43rd to the 50th the driving piece (26) is located at a peripheral edge of the rotatable portion (12)

In a 52nd aspect according to any one of the preceding aspects from the 43rd to the 51st:
the guide (101) extends between a first and a second end portion (101b, 101c),
the first end portion (101b) of the guide (101) extends underneath the peripheral edge of the rotatable portion (12),
the second portion (101c) of the guide (101) extends underneath a central portion of the rotatable portion (12), wherein the guide (101) cooperates with the driving piece (26) and, following a displacement of the belt body (13) along said advancement direction, cause a rotation of the rotatable portion (12) by 90° or multiples thereof.

In a 53rd aspect according to any one of the preceding aspects from the 43rd to the 52nd the control mechanism (100) comprises at least one auxiliary guide (104) developing on a plane parallel to the operative tract (2a) of the conveyor belt (2) and extending along a respective predetermined operative path.

In a 54th aspect according to the preceding aspect the auxiliary guide (104) exhibits a longitudinal extension ($104_L$), measured parallel to the advancement direction (A), greater than a transversal extension ($104_T$) of the same guide measured perpendicularly to the advancement direction (A).

In a 55th aspect according to the 53rd or 54th aspect the control mechanism (100) includes:
- at least a first driving piece (26a) emerging from the bottom surface (55) of the rotatable portion (12), the guide (101) being configured to drive the first driving piece (26a) along its predetermined operative path following the displacement of the belt body (13) along said advancement direction (A), causing the rotation of the article (P),
- at least a second driving piece (26b), emerging from the bottom surface (55) of the rotatable portion (12), positioned at least 90° apart the first driving piece (26a), said auxiliary guide (104) being configured to drive the second driving piece (26) along its respective predetermined operative path during the displacement of the belt body (13) along said advancement direction (A), causing the rotation of the article (P).

In a 56th aspect according to the preceding aspect the control mechanism is configured such that the auxiliary guide (104) engages the second driving piece (26b) before the first driving piece (26) engages said guide (101).

In a 57th aspect according to any one of the preceding aspects from the 54th to the 56th the ratio between the longitudinal extension ($104_L$) and the transversal extension ($104_T$) of the auxiliary guide (104) is greater than 1.5, optionally equal or greater than 2, more optionally comprised between 2 and 4.

In a 58th aspect according to any one of the preceding aspects from the 54th to the 57th the ratio between the longitudinal extension ($104_L$) of the auxiliary guide (104) and the transversal size of the rotatable portion (12) is comprised between 0.8 and 1.2, optionally the longitudinal extension ($104_L$) of the auxiliary guide (104) is equal to the transversal size of the rotatable portion (12).

In a 59th aspect according to any one of the preceding aspects from the 53rd to the 58th the auxiliary guide (104) is distinct and spaced with respect the guide (101).

In a 60th aspect according to any one of the preceding aspects from the 53rd to the 59th the auxiliary guide (104) is spaced from the guide (101) in a direction perpendicular to the advancement direction (A).

In a 61st aspect according to any one of the preceding aspects from the 53rd to the 60th the auxiliary guide (104) is spaced from the guide (101) both in a direction perpendicular to the advancement direction (A) and in a direction parallel to the advancement direction (A).

In a 62nd aspect according to any one of the preceding aspects from the 53rd to the 61st the belt body presents two longitudinally adjacent transversal halves, and the guide (101) extends underneath one of the two transversal halves of the belt body (13) while the auxiliary guide (104) extends underneath the other of the two transversal halves of the belt body (13).

In a 63rd aspect according to any one of the preceding aspects from the 53rd to the 62nd the respective predetermined operative path of the auxiliary guide (104) defines, for at least of a tract of said path, a curved profile.

In a 64th aspect according to any one of the preceding aspects from the 43rd to the 63rd the curved profile, optionally the parabolic curve, of the predetermined operative path of the guide (101) has a pre-determined concavity oriented towards a lateral edge of the belt body (13).

In a 65th aspect according to any one of the preceding aspects from the 63rd to the 64th the curved profile of the respective operative path of the auxiliary guide (104) has a respective concavity oriented towards the same lateral edge of the belt body (13)

In a 66th aspect according to any one of the preceding aspects from 43rd to 65th said control mechanism (100) comprises:
- at least one first guide (102) extending along a first operative path,
- at least a second guide (103) extending along a second operative path,
wherein each one of said first and second guides (102, 103) exhibits a curved profile, optionally a substantially parabolic profile, with concavity directed to the same side. In a 67th aspect according to the preceding aspect the operative paths of the first and second guide (102, 103) join at a common end point and are substantially symmetrical with respect to a direction perpendicular to the advancement direction (A).

In a 68th aspect according to any one of the preceding aspects from 43rd to 67th wherein the control mechanism comprises:
- at least one first auxiliary guide (105) extending along a first operative path,
- at least a second auxiliary guide (106) extending along a second operative path, wherein the first operating path of the first auxiliary guide intersects with the second operating path of the second auxiliary guide.

In a 69th aspect according to the preceding aspect the rotatable portion (12) comprises four driving pieces (26a, 26b, 26c, 26d) positioned 90° apart the one from the other and emerging from the bottom surface (55) of the rotatable portion (12). In a 70th aspect according to the preceding aspect each driving piece is configured to cooperate with one of the guides between:
- the first guide (102),
- the second guide (103),
- the first auxiliary guide (105),
- the second auxiliary guide (106);

the first and second guides (102, 103) together with the first and second auxiliary guides (105, 106), during the displacement of the belt body (13) along said advancement direction (A), are configured to cooperate with the four driving pieces (26a, 26b, 26c, 26d) of the rotatable portion (12), causing rotation of this latter.

In a 71st aspect according to any one of the preceding aspects from 43rd to 70th the belt body (13) has a top surface (14) which positions in alignment with the top surface (15) of the rotatable portion (12).

In a 72nd aspect according to any one of the preceding aspects from 43rd to 71st the belt body (13) has an aperture (16) configured for receiving the rotatable portion (12), wherein the belt body aperture is shaped as the peripheral edge of the rotatable portion (12).

In a 73rd aspect according to any one of the preceding aspects from 43rd to 72nd the frame (3) extends along a first and second opposite longitudinal ends (1a, 1b), the frame (3) supports a turning assembly (7) at each of said first and second longitudinal ends of the conveyor (1), the conveyor belt (2) being engaged around the two turning assemblies (7) and configured according to a closed loop thereby forming an endless conveyor belt (2).

In a 74th aspect according to the preceding aspect at least one of the turning assemblies (7) is connected to a motor (8) in order to receive rotational power from the motor (8) and turn it into advancement movement of the conveyor belt (2).

In a 75th aspect of the 73rd or 74th aspect each turning assembly (7) comprises:
- a turning shaft (9) carrying at least one sprocket (10), engaging the bottom surface (55) of the conveyor belt (2), and
- one or more central support disks (11) designed and positioned to support a central zone of the conveyor belt (2).

In a 76th aspect according to any one of the preceding aspects from the 43rd to the 75th the rotatable portion (12) is engaged to a belt body (13) segment such that when this belt body segment is planar also the associated rotating portion (12) is planar but can turn relatively to the belt body (13) according to a rotation axis (R) perpendicular to the belt body segment.

In a 77th aspect according to any one of the preceding aspects from the 43rd to the 76th the control mechanism (100) comprises:
- a base plate (120) parallel to the operative tract (2a) of the conveyor belt (2),
- a plurality of longitudinally adjacent blocks (122, 123, 124, 125, 126) emerging from the base plate (120) having sides which form the first and second guides and/or the first and second auxiliary guides,
- one or more activating elements (130, 135) cooperating with one the longitudinally adjacent blocks and selectively serving to deviate the trajectory of pieces (26) interacting with the control mechanism (100).

In a 78th aspect according to any one of the preceding aspects from the 43rd to the 77th the control mechanism (100) comprises at least one between:
- two first guides (102) symmetrical to a line passing through the centre of the belt body and developing parallel to the advancement direction A;
- two second guides (103) symmetrical to a line passing through the centre of the belt body and developing parallel to the advancement direction (A).

In a 79th aspect according to any one of the preceding aspects from the 43rd to the 78th the control mechanism (100) comprises at least one between:
- a first activating element (130) relatively movable with respect the support frame (3) and configured to guide the driving piece (26) into one of said two first guides (102), and
- a second activating element (135) relatively movable with respect the support frame (3) and configured to guide the driving piece (26) into one of said two second guides (103).

In a 80th aspect according to the preceding aspect said activating element or each one of said activating elements (130, 135) is movable along a direction perpendicular to the operative tract (2a) of the conveyor belt (2) at least between:
- one lower position in which it is configured to allow undisturbed passage of the driving piece (26),
- one upper position in which it is configured to contact the driving piece and direct it onto the respective guide.

In a 81st aspect according to any one of the preceding aspects from the 43rd to the 80th the control mechanism (100) comprises:
- at least one sliding block (140) relatively movable with respect the support frame (3) and configured to guide the driving piece (26) into one auxiliary guide,
- optionally a further sliding block (145) relatively movable with respect the support frame (3) and configured to guide the driving piece (26) into another auxiliary guide.

In a 82nd aspect according to the preceding aspect the sliding block (140) or each one of said sliding blocks (140, 145) is movable along an horizontal direction parallel to the operative tract (2a) of the conveyor belt (2) and perpendicular with respect the advancement direction (A) at least between:
- one inactive position in which sliding block allows undisturbed passage of the driving piece (26),
- one active position in which the sliding block directs the driving piece into the respective auxiliary guide.

In a 83rd aspect according to any one of the preceding aspects from the 43rd to the 82nd the conveyor belt (2) is of the type according to any one of the preceding aspects from the 1st to the 40th.

In a 84th aspect is provided a packaging apparatus (200) comprising:
- at least one conveyor (1) according to any one of the preceding aspect;
- at least one sealing station (201) configured to apply a sealing film to the article to be packaged in a 85th aspect according to the preceding aspect the conveyor (1) is configured to:
- convey articles to be packaged to the sealing station (201), or
- receive packages exiting the sealing station (201).

In a 86th aspect according to the 84th or 85th aspect the packaging apparatus (200) further comprising a control unit (50) configured to synchronize movement of the conveyor (1) with the sealing process performed by the sealing station (201).

BRIEF DESCRIPTION OF THE DRAWINGS

Some embodiments and some aspects of the invention will be described hereinafter with reference to the accompanying drawings, provided for indicative and therefore not limiting purposes, in which:

FIG. 3 shows the conveyor of FIG. 2 under a different perspective angle;

FIG. 4 is a top view of the conveyor of FIGS. 2 and 3;

FIG. 19c is a prospective view of the seven interconnected sub-elements after the mounting phase;

FIG. 19D is a cross-section of interconnected sub-elements;

FIGS. 20A and 20B are perspective view of a further embodiment of sub-element forming part of the rotatable portion;

FIG. 20E is a prospective view of the seven interconnected sub-elements of FIGS. 20C and 20D after the mounting phase;

FIG. 20F is a cross-section of interconnected sub-elements;

CONVENTIONS

Figure 1:
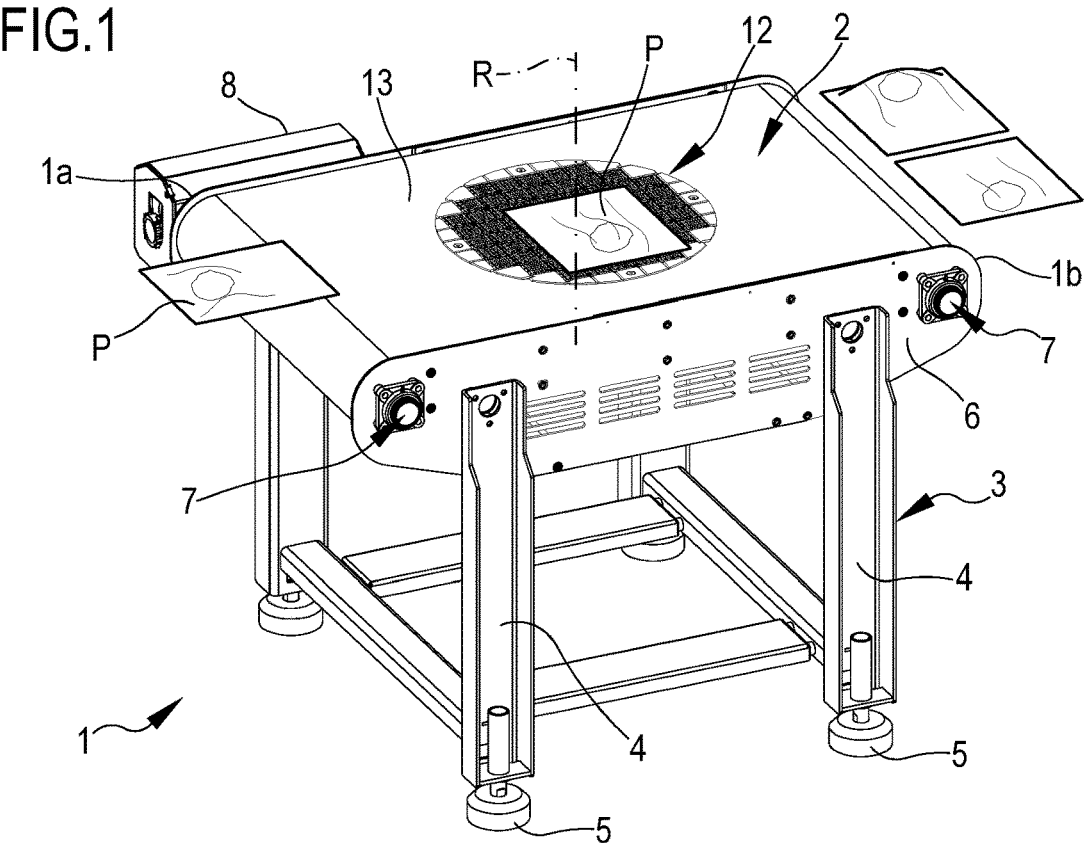
FIG. 1 is a perspective view of a conveyor using a conveyor belt, according to aspects of the invention.

It should be noted that in the present detailed description, corresponding parts illustrated in the various figures are indicated with the same reference numerals. The figures could illustrate the object of the invention by means of non-scale representations; therefore, parts and components shown in the figures relating to the object of the invention could only concern schematic representations.

Definitions

Packaging

The invention may find application for packaging a product into a packaging solely formed of one or more plastic films, or for packaging of a product positioned on a support to which a plastic film is heat sealed. Note the product may be a food product or not. As used herein support means either a substantially flat element onto which a product is placed, or a container of the type having a base wall, a side wall and a top rim radially emerging from the side wall, the container defining a volume into which the product is positioned. The tray or supports may have a rectangular shape or any other suitable shape, such as round, square, elliptical etcetera, and may be formed either while the packaging process takes place, e.g. at a thermoforming station of the packaging apparatus, or they may be manufactured beforehand and then fed to the packaging apparatus.

Product

The term product refers to an article or a composite of articles of any kind. For example, the product may be of a foodstuff type and be in the solid, liquid or gel state, i.e. in the form of two or more of the aforementioned aggregation states. In the food sector, the product can include: meat, fish, cheese, treated meats, prepared and frozen meals of various kinds.

Control Unit

The apparatus described and claimed herein may include one or more control units, designed to control the operations performed by the apparatus. The control unit can evidently be only one or be formed by a plurality of distinct control units according to the design choices and operational needs.

The term control unit means an electronic component which can comprise at least one of: a digital processor (for example comprising at least one selected in the group between: CPU, GPU, GPGPU), a memory (or memories), an analog circuit, or a combination of one or more digital processing units with one or more analog circuits. The control unit can be "configured" or "programmed" to perform some steps: this can be done in practice by any means that allows you to configure or program the control unit. For example, in the case of a control unit comprising one or more CPUs and one or more memories, one or more programs can be stored in appropriate memory banks connected to the CPU or to the CPUs; the program or programs contain instructions which, when executed by the CPU or the CPUs, program or configure the control unit to perform the operations described in relation to the control unit. Alternatively, if the control unit is or includes analog circuitry, then the control unit circuit may be designed to include configured circuitry in use to process electrical signals so as to perform the steps related to control unit. The control unit may comprise one or more digital units, for example of the microprocessor type, or one or more analog units, or a suitable combination of digital and analog units; the control unit can be configured to coordinate all the actions necessary for executing an instruction and instruction sets.

Actuator

The term actuator means any device capable of causing movement on a body, for example under the control of the control unit. The actuator can be of an electric, pneumatic, mechanical type, or of another type.

DETAILED DESCRIPTION

Figure 5:
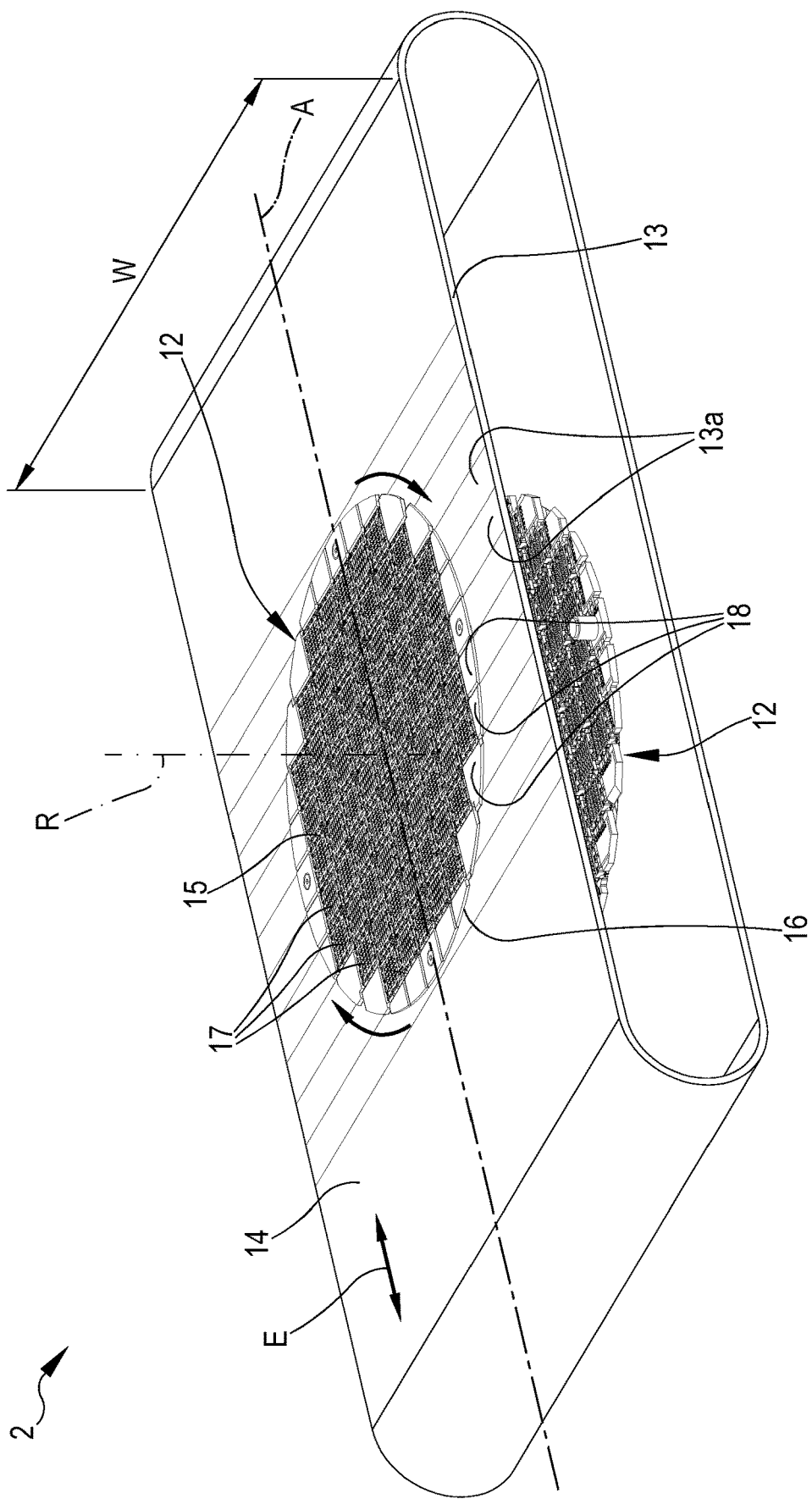
FIG. 5 is a perspective view an endless conveyor belt according to aspects of the invention.
Figure 6:
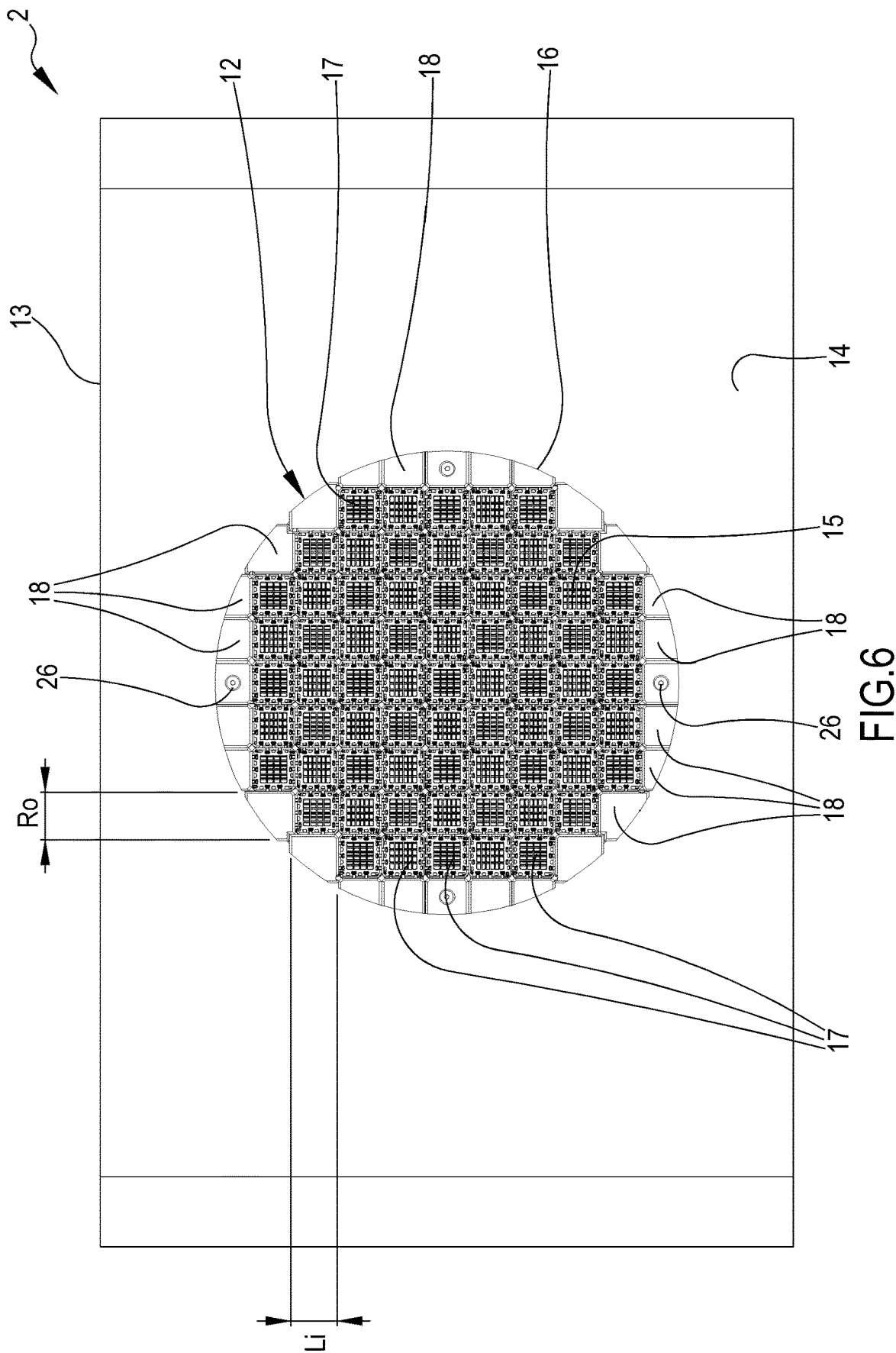
FIG. 6 is a top view of the conveyor belt of FIG. 5.

With reference to the attached figures, reference numeral 1 identifies a conveyor according to aspects of the invention. The conveyor 1 comprises a conveyor belt 2 mounted on a frame 3. As shown in the exemplifying embodiment of FIGS. 1 to 4, the frame 3 may for example comprise a number of legs 4 having, at a bottom end, feet 5 designed to contact the ground and carrying, at a top end, a support panel 6 on each longitudinal side of the conveyor 1. The frame 3, and specifically the panels 6 support a turning assembly 7 at each of the opposite longitudinal ends of the conveyor 1. The conveyor belt 2 is engaged around the two turning assemblies 7 and configured according to a closed loop thereby forming an endless conveyor belt 2. Although in the example shown, only two turning assemblies are shown, it is evident to the skilled person that three or more turning assemblies 7 could be envisaged depending upon the length and shape of the non-rectilinear path to be followed by the conveyor belt 2. Moreover, at least one of the turning assemblies 7 is connected to a motor 8 in order to receive rotational power from the motor 8 and turn it into advancement movement of the conveyor belt 2. In the example shown in FIGS. 1-4, each turning assembly 7 (see in particular FIGS. 2-4)

comprises a turning shaft 9 carrying a number of rotating elements, namely at least one sprocket 10 engaging a bottom surface 55 of the conveyor belt 2 and one or more central support disks 11 designed and positioned to support a central zone of the conveyor belt. It is however not excluded that the turning assembly 7 may comprise a roller. In detail, the conveyor belt 2 is configured to receive and move at least one article P along an advancement direction A on a planar operative tract 2a (see FIG. 5). As shown in FIGS. 1, 5 and 6, the conveyor belt 2 comprises at least one rotatable portion 12 coupled to a belt body 13 of the conveyor belt 2: in the example shown in the appended figures the conveyor belt 2 comprises two rotatable portions 12. Each rotatable portion 12 is configured to turn relative to the belt body 13: in practice, the rotatable portion 12 is engaged to a belt body segment such that when this belt body segment is planar also the associated rotating portion 12 is planar but can turn relatively to the belt body according to a rotation axis R perpendicular to the belt body segment. Furthermore, the belt body segment top surface 14 and the top surface 15 of the associate rotatable portion 12 are both configured to receive articles P (see FIG. 1) to be conveyed and are positioned in mutual alignment and thus when the belt body segment carrying the rotatable portion 12 is planar the top surfaces 14 and 15 are co-planar: in other words each segment of the belt body 13 where a rotatable portion 12 is present has an aperture 16 configured for receiving the rotatable portion 12 whereby the top surface 15 of said rotating portion 12 is flush with the top surface 14 of the respective belt body segment.

Figure 7:
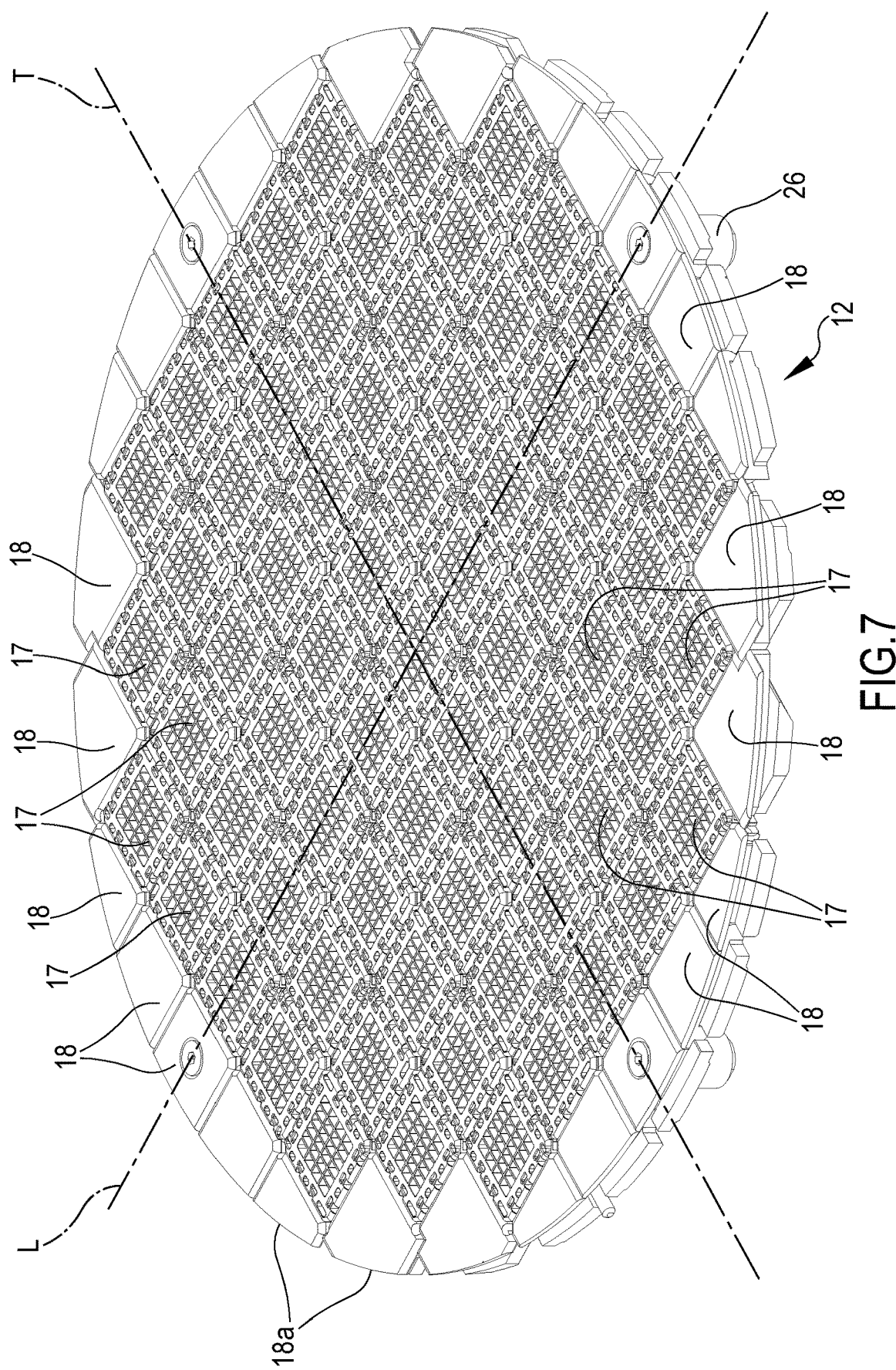
FIG. 7 is a detailed perspective view of the top side of a rotatable portion of the conveyor belt of FIGS. 5 and 6.
Figure 8:
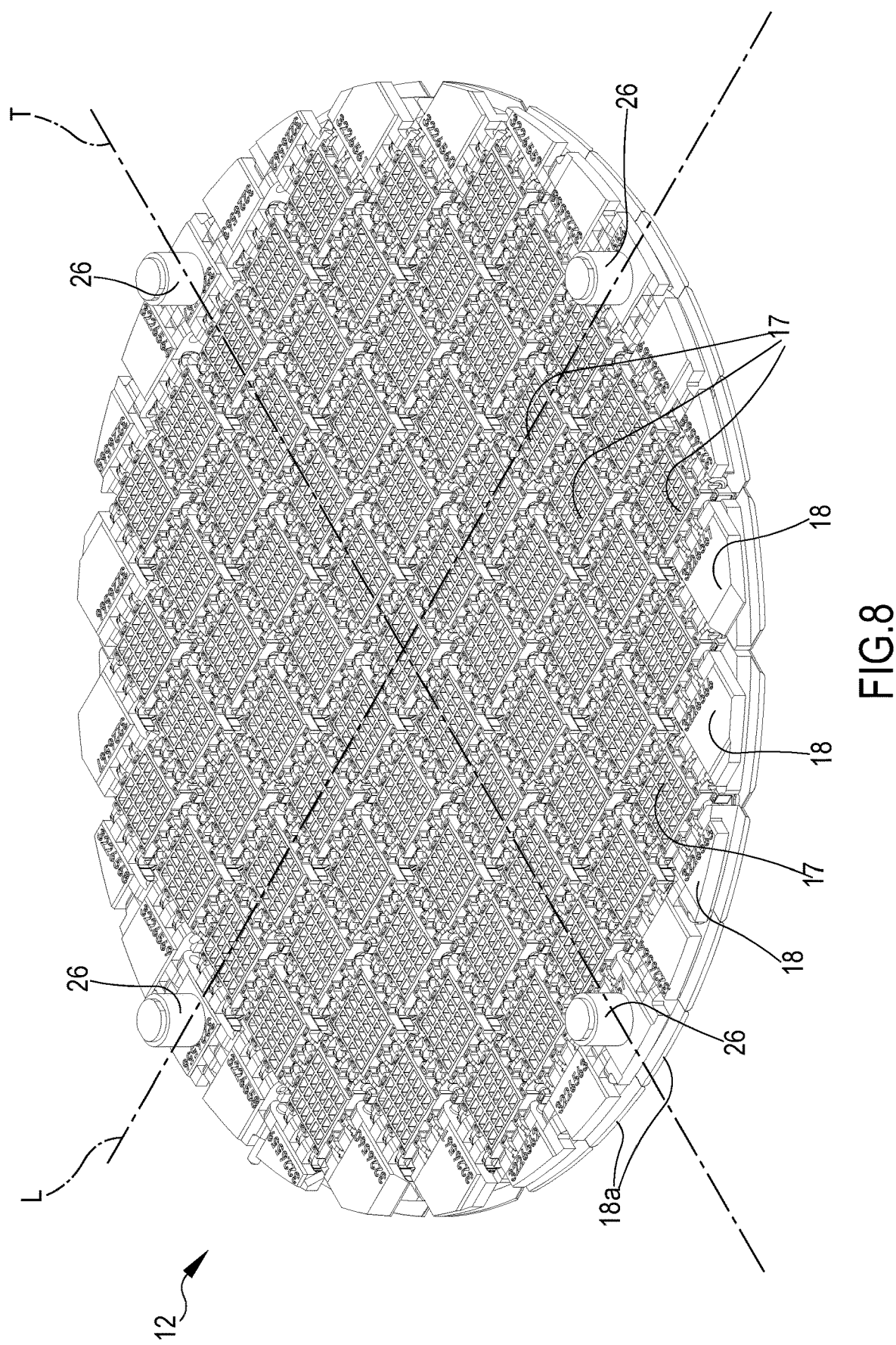
FIG. 8 is a detailed perspective view of the bottom side of a rotatable portion of the conveyor belt of FIGS. 5 and 6.

In accordance with an aspect, and making specific reference to FIGS. 7, 8 and 14 to 19, it is noted that each rotatable portion 12 comprises a plurality of sub-elements 17 wherein each one of the sub-elements 17 of the rotatable portion 12 is rotatably connected to an adjacent sub-element 17. In FIGS. 7 and 8 an ideal line L represents the longitudinal direction while an ideal line T, perpendicular to line L, represents the transverse direction: making reference to the longitudinal direction L and to the transverse direction T, it is possible to see that each one of the sub-elements 17 of the rotatable portion 12 is rotatably connected to at least one longitudinally adjacent sub-element (i.e., to a sub element which is adjacent in the longitudinal direction L) and to a transversally adjacent sub-element (i.e., to a sub-element which is adjacent in the transverse direction). More in detail, the more central sub-elements 17 are each surrounded by four other sub-elements: namely two longitudinal adjacent sub-elements and two transversally adjacent sub-elements, while the more peripheral sub-elements 17 are connected with only two or three adjacent sub-elements and with perimeter bodies 18, as clearly visible in FIGS. 7 and 8.

Going into further detail of the structure of each sub-element 17, it is noted that each sub-element 17 presents a top face 17a, a bottom face 17b, first opposite side portions 17c extending between the top and the bottom faces of each sub-element, and second opposite side portions 17d extending between the top and the bottom faces of each sub-element (see FIGS. 14-16, 20A and 20B). In one aspect, each sub-element 17 includes a four sided prismatic central body having a reticular structure with a multiplicity of through passages that put in fluid communication the bottom face 17b and the top face 17a of the sub-element 17, thereby being adapted to support any type of article and at the same time offering escape passages for the drainage of liquids. In accordance with a further aspect, each one of said sub-elements 17 may have a centrally symmetric structure. Moreover, in accordance with a possible aspect, all sub-elements 17 of the rotatable portion 12 are structurally identical, such that they may be easily manufactured using a single mould type.

Each one of the sub-elements 17 further comprises one or more first annular features 19 at each of the first opposite side portions 17c, and one or more second annular features 20 at each the second opposite side portions 17d: in the embodiments shown in FIGS. 14-20F, each annular feature 19, 20 is a ring emerging orthogonal to the respective side portion.

In a first embodiment shown in FIGS. 14-19D, the first annular features 19 of a sub-element 17 mate with the second annular 20 features of an adjacent sub-element (see FIG. 17) forming a coupling seat 21 between the two coupled adjacent sub-elements. The coupling seat 21 of two transversally adjacent sub-elements 17 extends along an axis of rotation $A_L$ parallel to the longitudinal direction L, while the coupling seat of two longitudinally adjacent sub-elements 17 extends along an axis of rotation $A_T$ which parallel to the transverse direction T; at least one pin 22 is inserted in the coupling seat 21 formed between the two adjacent sub-elements 17 to rotatably connect the same two adjacent sub-elements.

As it is visible from the drawings, each sub-element 17 comprises a plurality of first annular features 19 (for example three or more) emerging from each one of the respective first side portions 17c and a plurality of second annular features 20 (for example 2 or more) emerging from each one of the respective second side portions 17d of the same sub-element 17: in particular, the first annular features 19 may be one more in number than the second annular features 20 such that when mating the first annular features of one sub-element with the second annular features of an adjacent sub-element the second annular features 20 seat in the spaces 23 defined between the first annular features 19. In the examples shown, each sub-element 17 has four side portions defined by two first opposite side portions 17c and by two opposite second side portions 17d: in this case, the first annular features 19 emerging from a same first side portion 17c are coaxially aligned along a respective axis of rotation $A_L$ or $A_T$, while the second annular features 20 emerging from a same second side portion 17d are coaxially aligned along a respective axis of rotation $A_T$ or $A_L$; in particular, the second annular features 20 emerging from a same second side portion 17d are perpendicular the same side portion and to the first annular features 19 emerging perpendicularly to an adjacent first side portion 17c.

As explained above for the first embodiment of the sub-elements, adjacent sub-elements 17 are mutually coupled by mating the first annular features 19 of one sub-element with the second annular features 20 of an adjacent sub-element to form the coupling seat 21 where the pin 22 is inserted. In order to avoid extraction of the pin 22 from the coupling seat 21 each sub-element 17 comprises two lock protrusions 25 and two axial stops 24: in practice, each sub-element carries a lock protrusion 25 and an axial stop 24 for each one of its first opposite side portions 17c, as it will be described in greater detail herein below.

Figure 14:
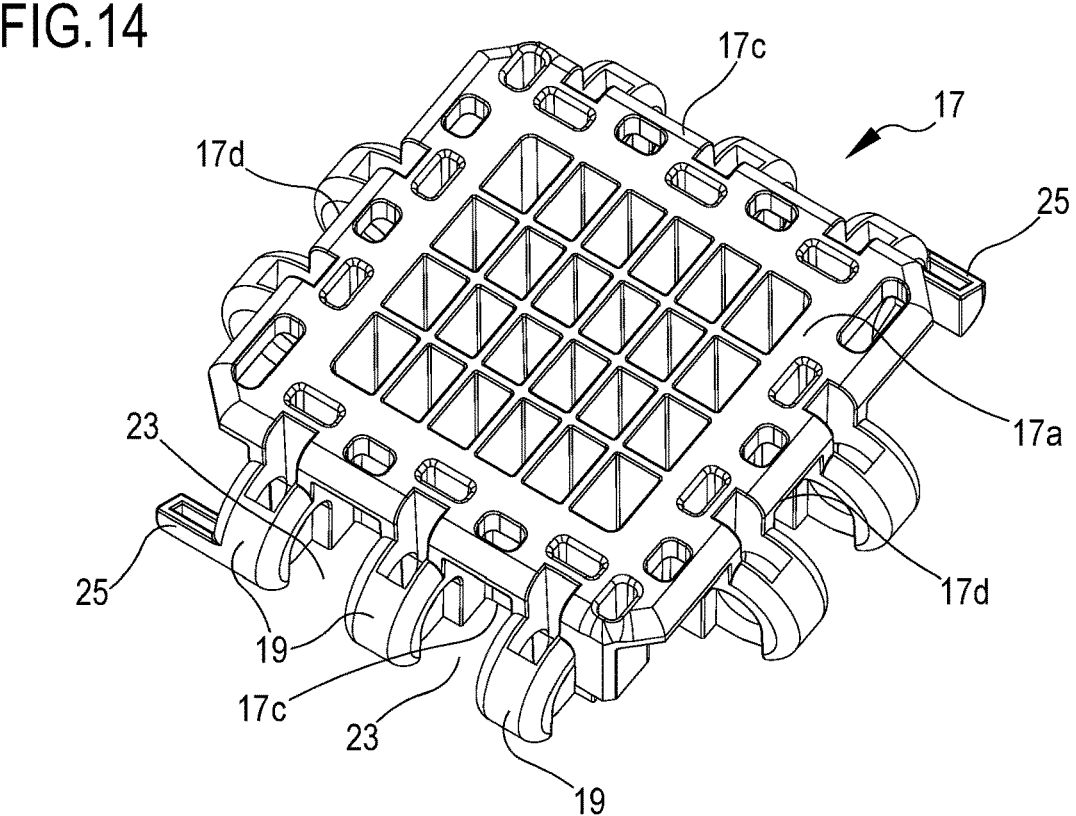
FIG. 14 is a perspective view from top of a sub-element forming part of the rotatable portion of FIGS. 7 and 8.
Figure 15:
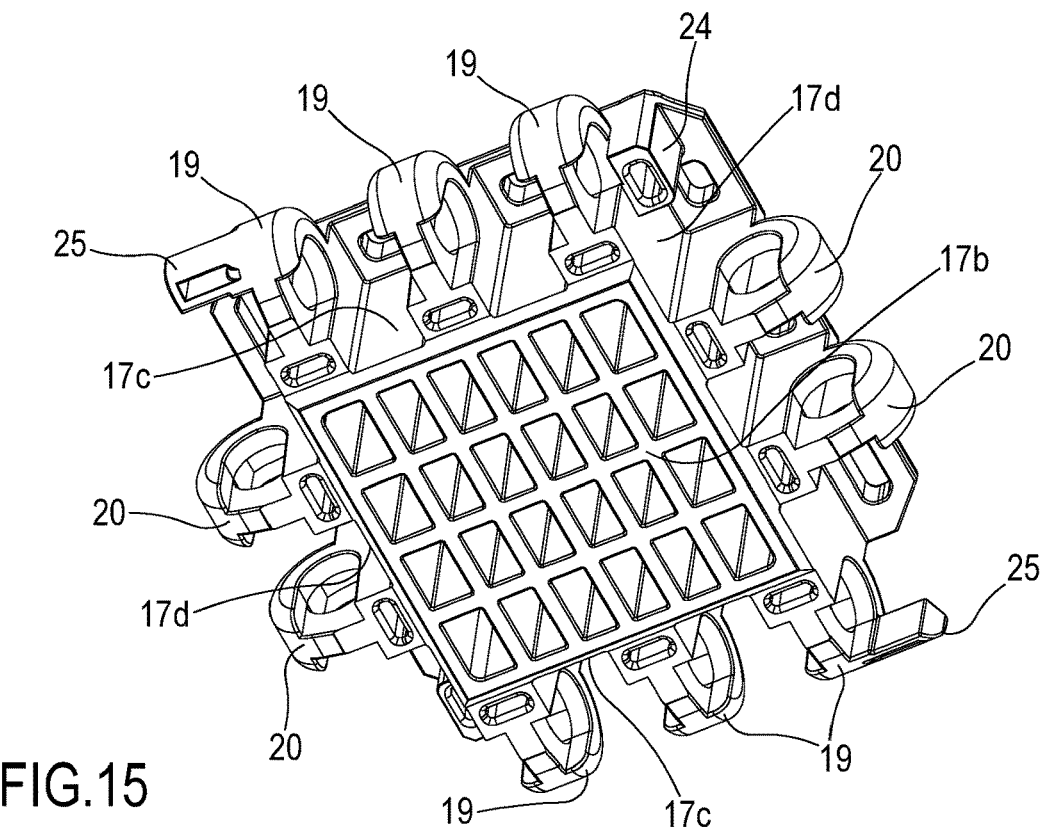
FIG. 15 is a perspective view from bottom of a sub-element forming part of the rotatable portion of FIGS. 7 and 8.
Figure 16:
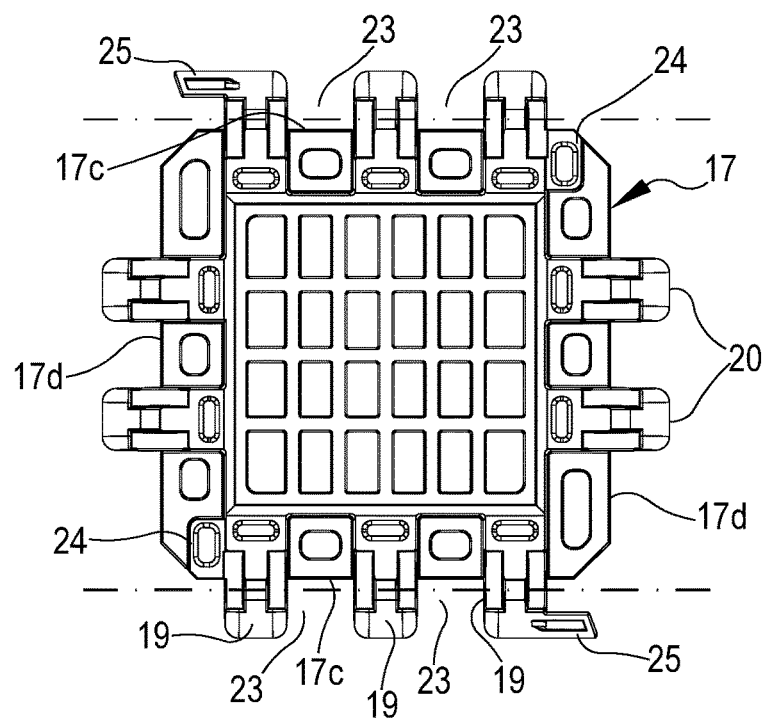
FIG. 16 is top view of a sub-element forming part of the rotatable portion of FIGS. 7 and 8.

Each lock protrusion 25 extends parallel to the respective first side portion 17c and according to a direction opposite to that of the other lock protrusion 25 present in the same sub-element and associated to the opposite first side portion 17c; in particular, each protrusion 25 extends parallel to an axis of rotation $A_L$ or $A_T$ defined by the first annular features 19 of a same side portion: as it is visible in FIGS. 14-16 the first annular features 19 emerging from one first side portion 17c comprise a terminal first annular feature which carries one respective lock protrusion 25 extending transversally to said terminal first annular feature and away from the first annular features of the same first side portion; moreover, the first annular features 19 emerging from the opposite first side portion comprise another terminal first annular feature which carries one respective lock protrusion 25 extending transversally to said terminal first annular feature of the opposite first side portion and away from first annular features of the same first side portion. The two lock protrusions 25 of the same sub-element 17 extend in practice substantially parallel to each other and in opposite directions from the respective terminal first annular feature 19.

In order to understand to operation of the protrusions 25, it should be noted that each sub-element 17 of a same rotatable portion 12 is coupled with at least one longitudinally adjacent sub-element and with at least one transversally adjacent sub-element in a first coupling mode or in a second coupling mode: in practice half of the sub-elements 17 is in the first coupling mode while half of the sub-elements 17 is in the second coupling mode with the sub-elements in the first coupling mode being longitudinally and transversally alternated by a sub-elements in the second coupling mode.

Figure 17:
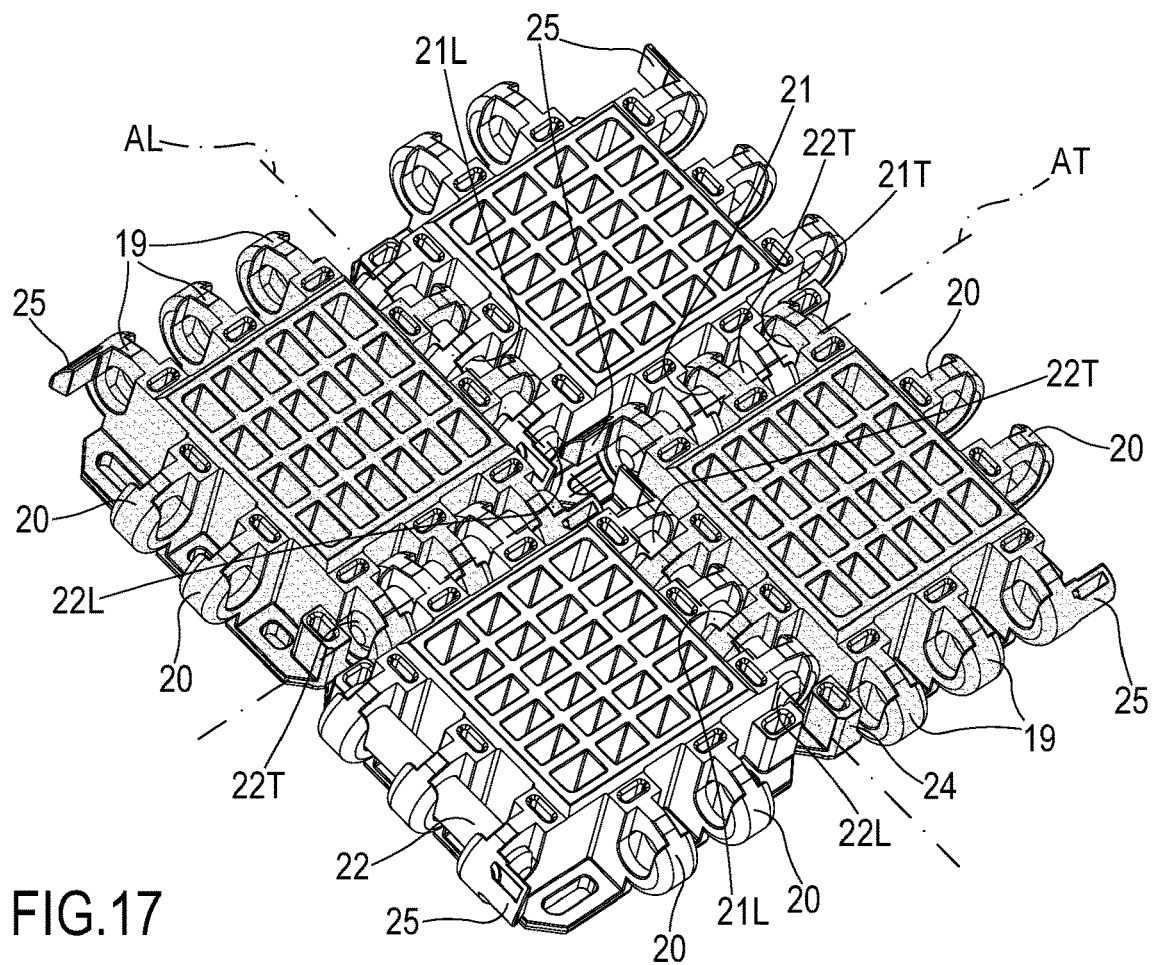
FIG. 17 is a perspective view from bottom of four interconnected sub-elements forming part of the rotatable portion of FIGS. 7 and 8.
Figure 18:
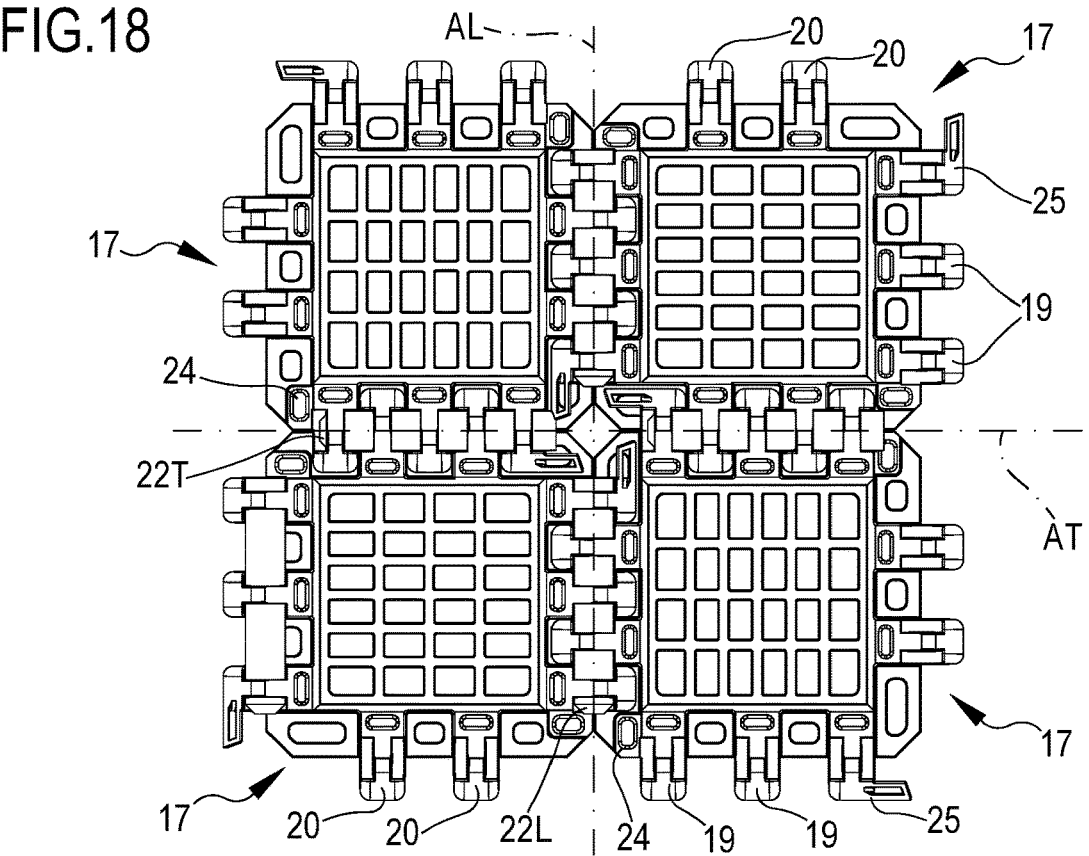
FIG. 18 is top view of the four interconnected sub-elements of FIG. 17.

To facilitate understanding, in FIG. 17, the sub-elements 17 in the first coupling mode have been shaded compared to the sub-elements 17 in the second coupling mode. As visible from FIG. 17, each sub-element in the first coupling mode complies with the following coupling conditions:

- is coupled with a longitudinally adjacent sub-element, with first annular features 19 of the sub-element mating with second annular features 20 of the longitudinally adjacent sub-element forming one transverse coupling seat 21T (i.e., one of the seats 21 with axis $A_T$ directed parallel to the transverse direction T) extending between the sub-element and the longitudinally adjacent sub-element,
- is coupled with a transversally adjacent sub-element, with second annular features 20 of the sub-element mating with first annular features 19 of the transversally adjacent sub-element forming one longitudinal coupling seat 21L (i.e., one of the seats 21 with axis $A_L$ directed parallel to the longitudinal direction L) extending between the sub-element and the transversally adjacent sub-element.

On the other hand, each sub-element 17 in the second coupling mode complies with the following coupling conditions:

- is coupled with a longitudinally adjacent sub-element, with second annular features 20 of the sub-element mating with first annular features 19 of the longitudinally adjacent sub-element 17 forming one transverse coupling seat 21T (i.e., one of the seats 21 with axis $A_T$ directed parallel to the transverse direction T) extending between the sub-element and the longitudinally adjacent sub-element,
- is coupled with a transversally adjacent sub-element, with first annular features of the sub-element mating with second annular features of the transversally adjacent sub-element forming one longitudinal coupling seat 21L (i.e., one of the seats 21 with axis $A_L$ directed parallel to the longitudinal direction L) extending between the sub-element and the transversally adjacent sub-element.

At least one transverse pin 22T is inserted in each one of said transverse coupling seats 21T and at least one longitudinal pin 22L inserted in each one of said longitudinal coupling seats 21L.

By virtue of the coupling structure among adjacent sub-elements 17 described above, longitudinally aligned sub-elements form lines Li of sub-elements 17 (see FIG. 6) presenting coaxial longitudinal coupling seats and transversally aligned sub-elements form rows Ro of sub-elements presenting coaxial transversal coupling seats, such that the rotatable portion is capable of bending and follow the non-linear path of the belt body.

Again with reference to FIGS. 14-19D, it should be noted that each given sub-element of the plurality of sub-elements positioned in the first coupling mode has one of its protrusions 25 acting as an axial lock against extraction of the pin 22 inserted in the coupling seat defined between a further sub-element, longitudinally adjacent to the given sub-element, and an additional sub-element transversally adjacent to the further sub-element.

On the other hand, each given sub-element of the plurality of sub-elements positioned in the second coupling mode has one of its protrusions 25 acting as an axial lock against extraction of the pin 22 inserted in the coupling seat defined between a further sub-element, transversally adjacent to the given sub-element, and an additional sub-element longitudinally adjacent to the further-sub-element.

In practice, each protrusion 25 carried by a given sub-element 17 prevents extraction of the pin interacting between two other neighboring sub-elements.

Figure 19:
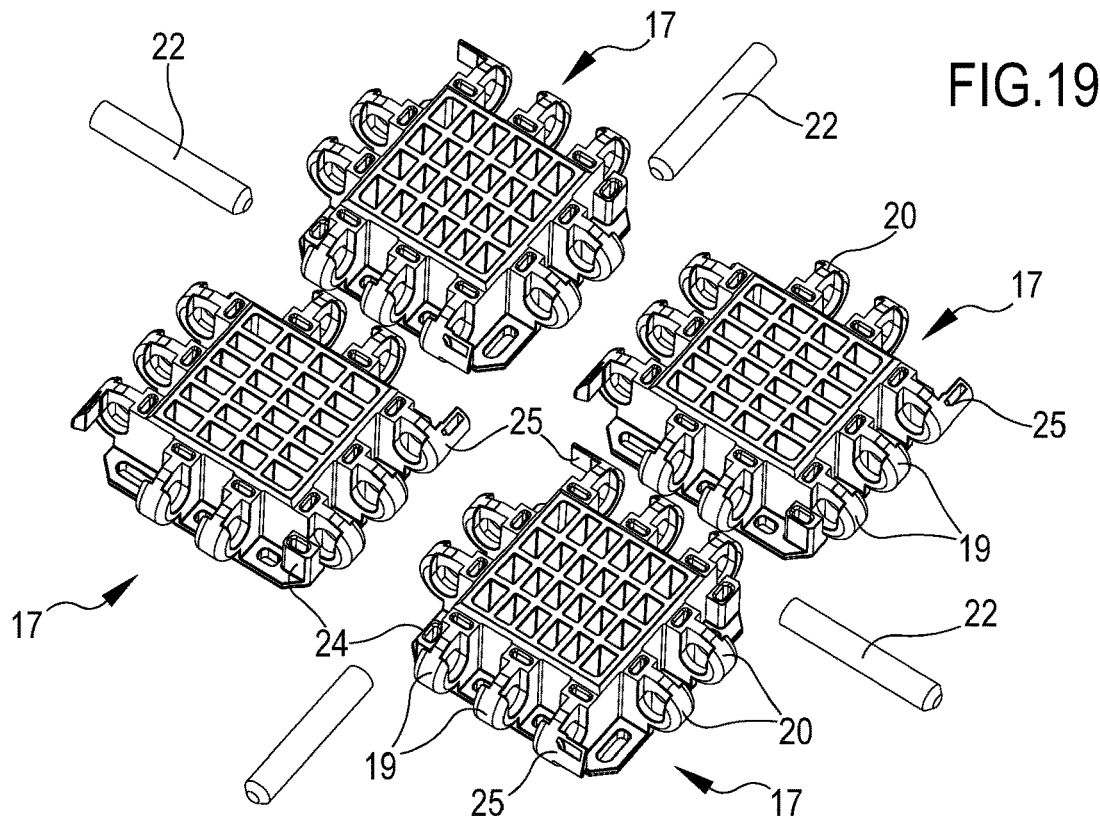
FIG. 19 is a perspective exploded view of the four interconnected sub-elements of FIG. 17.
Figure 19A:
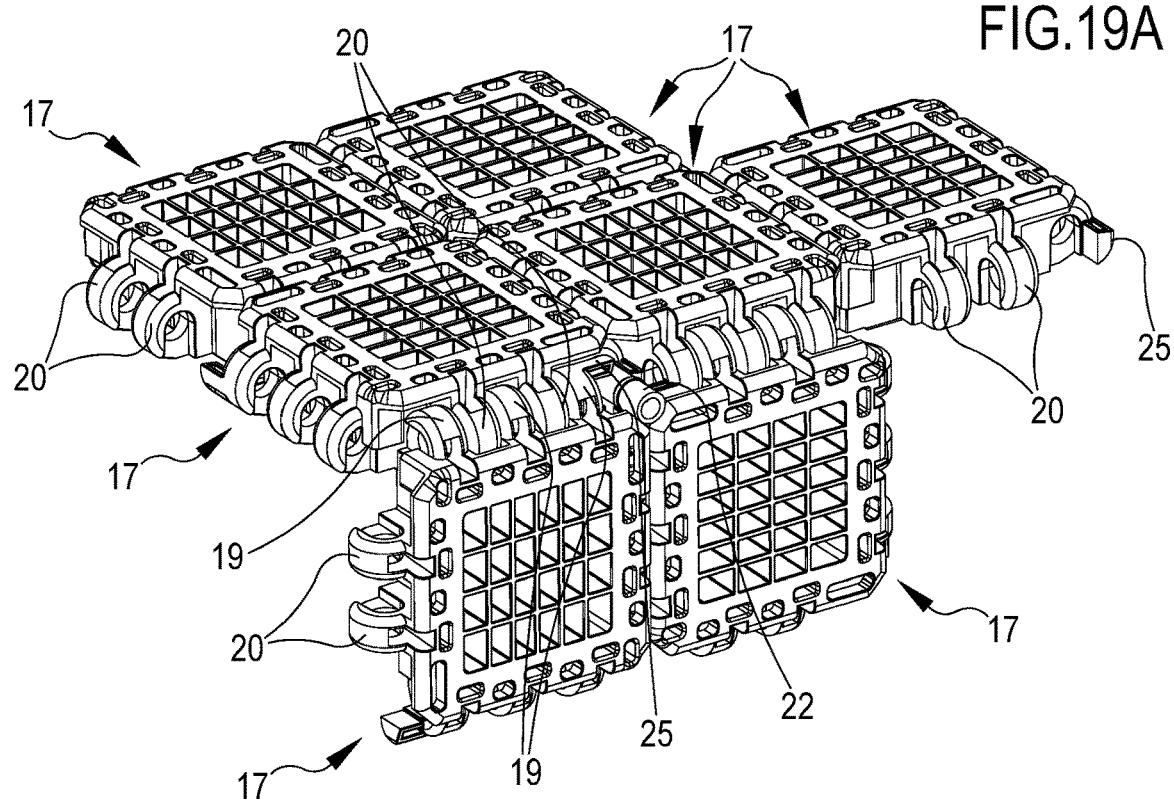
FIGS. 19A and 19B schematically show mounting phases of seven sub-elements of the rotatable portion.
Figure 19B:
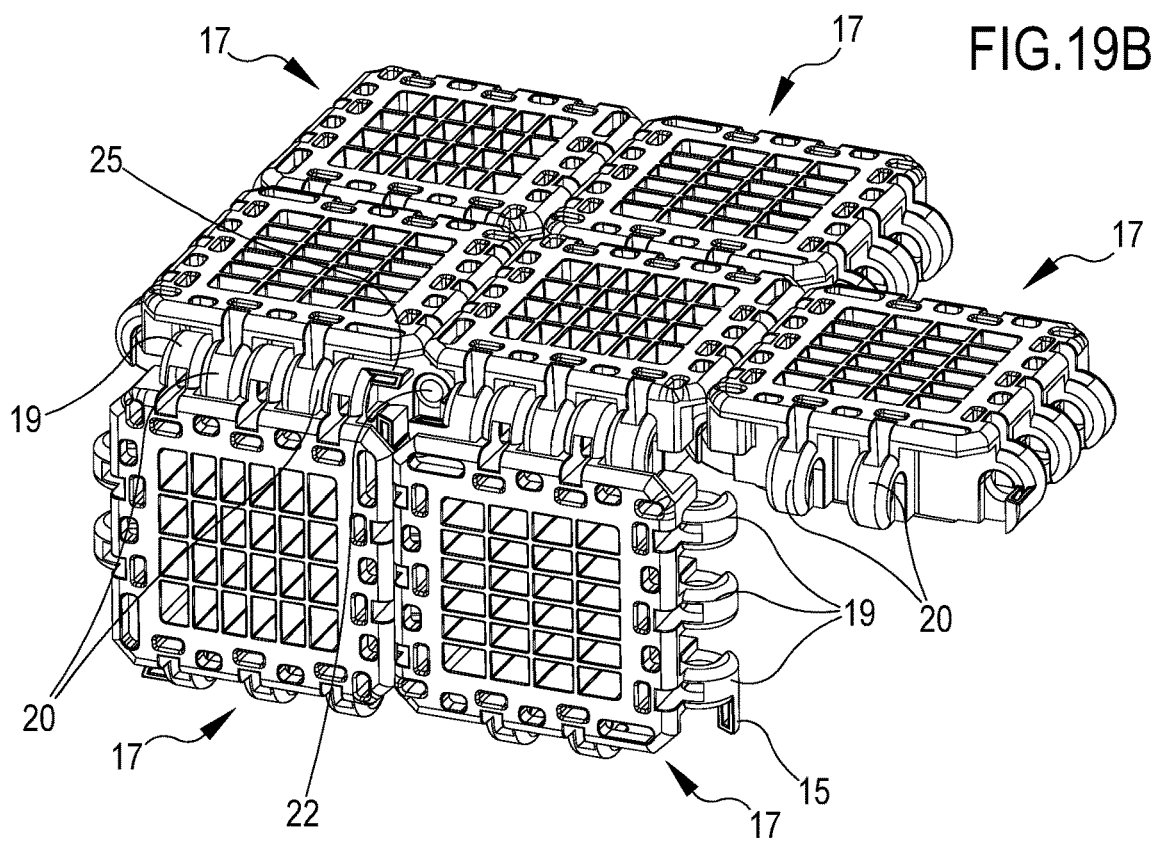

In order to allow insertion and extraction when needed of the pin 22 the protrusions 25 of each given sub-element prevent extraction of the pin only when the interested sub-elements are coplanar (see for example FIGS. 18 and 19C) or are not excessively inclined the one with respect to the other. More precisely, for each given sub-element positioned in the first coupling mode, one projection 25 of the given sub-element is configured to act as axial lock against extraction of the pin (connecting two neighboring sub-elements as described above) only when the given sub-element and the longitudinally adjacent sub-element are coplanar or inclined the one with respect to the other of a prefixed acute angle, while allowing extraction of the pin when the given sub-element and the longitudinally adjacent sub-element are inclined the one with respect to the other of an angle greater than said prefixed acute angle (see FIGS. 19A and 19B). Similarly, for each given sub-element positioned in the second coupling mode, one protrusion 25 of the given sub-element is configured to act as axial lock against extraction of the pin (connecting two neighboring sub-elements as described above) only when the given sub-element and the transversally adjacent sub-element are coplanar or inclined the one with respect to the other of a prefixed acute angle, while allowing extraction of the pin when the given sub-element and the transversally adjacent sub-element are inclined the one with respect to the other of an angle greater than said prefixed acute angle (see figured 19A and 19B).

As previously mentioned each sub-element also comprises an axial stop 24 for each first side portion 17c: in practice the axial stop may be structurally carried by one of the first annular features or by the first side portion or by a corner region of the sub element where one the first side portions 17c meets one of the second side portions 17d; in any case, each axial stop 24 defines an axial abutment for the pin inserted in the coupling seat formed between two adjacent sub-elements, such that when the pin 22 is inserted it has one end abutting against the axial stop and the opposite end axially blocked by the protrusion 25 of a neighboring sub-element.

In a second embodiment of the sub-elements 17 shown in FIGS. 20A-20F, the first annular features 19 of a sub-element 17 mate with the first annular features 19 of an adjacent sub-element forming a coupling seat 21 between the two coupled adjacent sub-elements; at the same time, the second annular features 20 of a sub-element 17 mate with the second annular features 20 of an adjacent sub-element forming a coupling seat 21 between the two coupled adjacent sub-elements. The coupling seat 21 of two transversally adjacent sub-elements 17 extends along an axis of rotation AL parallel to the longitudinal direction L, while the coupling seat of two longitudinally adjacent sub-elements 17 extends along an axis of rotation AT which parallel to the transverse direction T; at least one pin 22 is inserted in the coupling seat 21 formed between the two adjacent sub-elements 17 to rotatably connect the same two adjacent sub-elements.

As it is visible from the drawings, each sub-element 17 comprises a plurality of first annular features 19 emerging from each one of the respective first side portions 17c and a plurality of second annular features 20 emerging from each one of the respective second side portions 17d of the same sub-element 17. In particular, the first annular features 19 emerging from one first side portion 17c are one more in number of the first annular features 19 emerging from the opposite first side portion 17c such that when mating the first annular features of one sub-element with the first annular features of an adjacent sub-element the first annular features 19 of one sub-element seat in the spaces 23 defined between the first annular features 19 of the adjacent sub-element 17; moreover, the second annular features 20 emerging from one second side portion 17d are one more in number of the second annular features 20 emerging from the other opposite second side portion 17d such that when mating the second annular features of one sub-element with the second annular features of an adjacent sub-element the second annular features 20 of said one sub-element seat in the spaces 23 defined between the first annular features 20 of the adjacent sub-element 17. FIGS. 20A and 20B show seats 23 defined between of the first annular features 19 and between the second annular features 20 of a sub-element 17, as just described.

In detail, as shown in FIGS. 20A-20F, first annular features 19 emerging from one first side portion 17c are equal in number to the second annular features 20 emerging from one adjacent second side portion 17d.

In the examples shown in FIGS. 20A-20F, each sub-element 17 has four side portions defined by two first opposite side portions 17c and by two opposite second side portions 17d: in this case, the first annular features 19 emerging from a same first side portion 17c are coaxially aligned along a respective axis of rotation AL or AT, while the second annular features 20 emerging from a same second side portion 17d are coaxially aligned along a respective axis of rotation AT or AL; in particular, the second annular features 20 emerging from a same second side portion 17d extend perpendicular the same side portion and to the first annular features 19 emerging perpendicularly to an adjacent first side portion 17c.

As explained above for the second embodiment of the sub-elements, adjacent sub-elements 17 are mutually coupled by mating the first annular features 19 of one sub-element with the first annular features 19 of an adjacent sub-element to form the coupling seat 21 where one pin 22 is inserted and, at the same time, second annular features 20 of one sub-element couple with the second annular features 20 of an adjacent sub-element to form another coupling seat 21 where another pin 22 is inserted. In order to avoid extraction of the pin 22 from the respective coupling seat 21, each sub-element 17 comprises two lock protrusions 25 and two axial stops 24: in practice, each sub-element 17 carries a lock protrusion 25 and an axial stop 24 associated to one first side portion 17c and also carries a lock protrusion 25 and an axial stop 24 associated to the second side portion 17d adjacent to the first side portion 17c.

Each lock protrusion 25 extends parallel to the respective first and second side portion 17c, 17d and according to a direction intersecting to that of the other lock protrusion 25 of the same sub-element 17. The lock protrusion 25 of the first side portion 17c extends parallel to an axis of rotation defined by the first annular features 19 while the lock protrusion 25 of the second side portion 17d extends parallel to an axis of rotation defined by the second annular features 20. In particular, the two lock protrusions 25 respectively extend parallel to an axis of rotation AL and AT defined by the first and second annular features 19, 20 of the adjacent side portion.

Figure 20C:
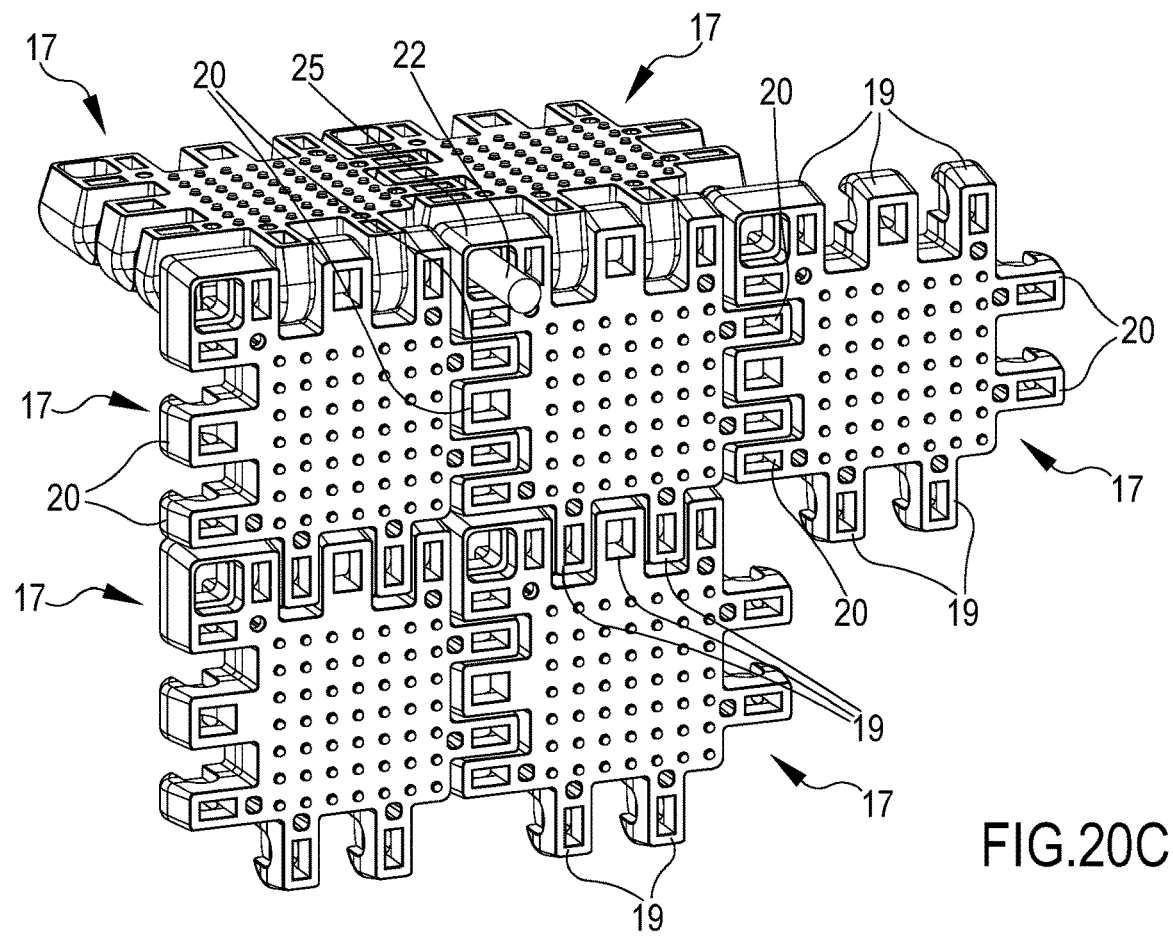
FIGS. 20C and 20D schematically show mounting phases of seven sub-elements according to FIGS. 20A and 20B.

As show for example in FIGS. 20A and 20B, in each one of said sub-elements 17, the first annular features 19 emerging from one of said opposite first side portions 17c comprise a terminal first annular feature which carries the respective lock protrusion 25 extending transversally to said terminal first annular feature and away from the first annular features of the same first side portion; moreover, the second annular features 20 emerging from one of said opposite second side portions 17d (namely the second side portion 17d adjacent to the first side portion 17c carrying the first annular features 19) comprise a terminal second annular feature which carries one respective lock protrusion 25 extending transversally to said terminal second annular feature and away from second annular features of the same second side portion 17d; the two lock protrusions 25 of the same sub-element 17 extend transversally, optionally perpendicular, to each other and are directed in intersecting directions from the respective terminal first and second annular feature. The two lock protrusions 25 may joined together to define a single piece placed at the corner of two adjacent first and second side portions 17c, 17d, as shown in FIGS. 20A-20F.

In order to understand operation of the protrusions 25, it should be noted that each sub-element 17 of a same rotatable portion 12 is coupled with at least one longitudinally adjacent sub-element and with at least one transversally adjacent sub-element in a single coupling mode wherein said plurality of sub-elements presents the same orientation (FIG. 20E). The lock protrusion 25 carried by a first annular feature 19 (first side portion 17c) of a given sub-element 17 is configured to act on a pin 22 inserted between the first annular features of two adjacent sub-elements 17 one of which is also adjacent to the given sub-element; in a similar manner, the lock protrusion 25 carried by a second annular feature 20 (second side portion 17d) of the same given sub-element 17 is configured to act on a pin 22 cooperating with second annular features of two adjacent sub-elements 17 one of which is also adjacent to the given sub-element. In practice, each protrusion 25 carried by a given sub-element 17 prevents extraction of the pin interacting between two other neighboring sub-elements.

By virtue of the coupling structure among adjacent sub-elements 17 described above, longitudinally aligned sub-elements form lines Li of sub-elements 17 (see FIG. 6) presenting coaxial longitudinal coupling seats and transversally aligned sub-elements form rows Ro of sub-elements presenting coaxial transversal coupling seats, such that the rotatable portion 12 is capable of bending and follow the non-linear path of the belt body.

Figure 20D:
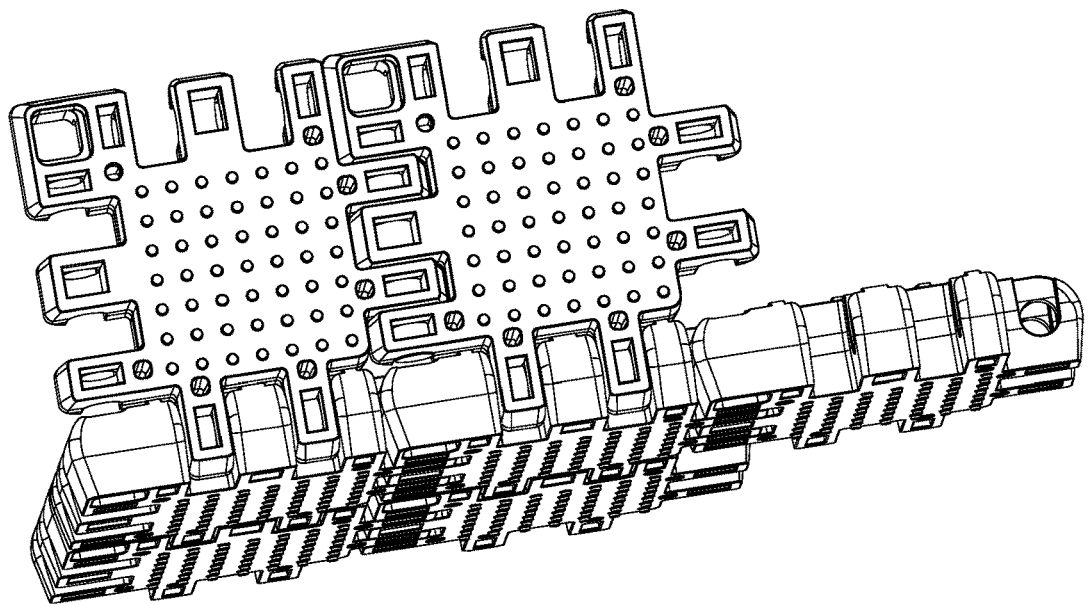
Figure 21:
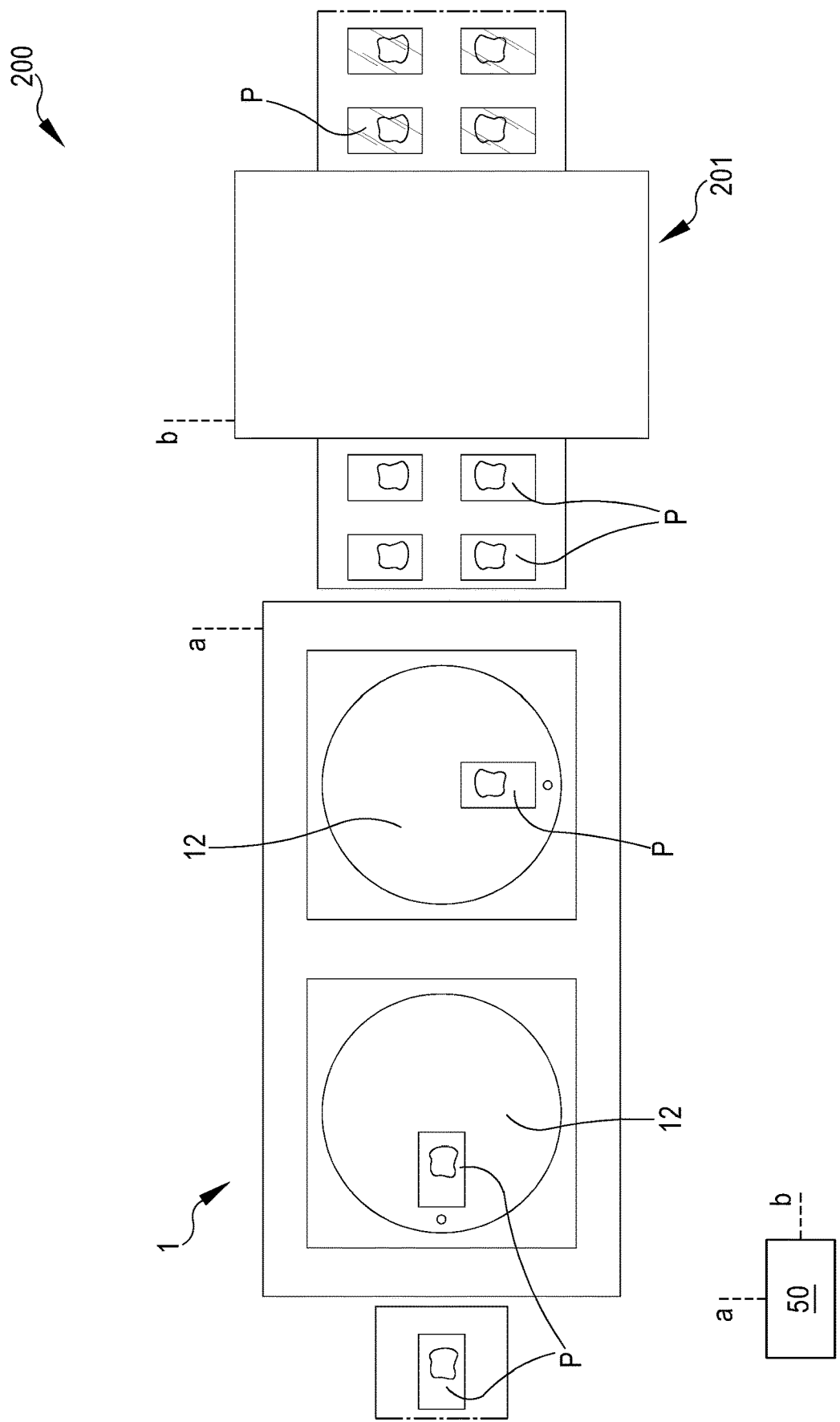
FIG. 21 is a schematic top view of a packaging apparatus comprising a conveyor according to aspects of the invention.
Figure 22:
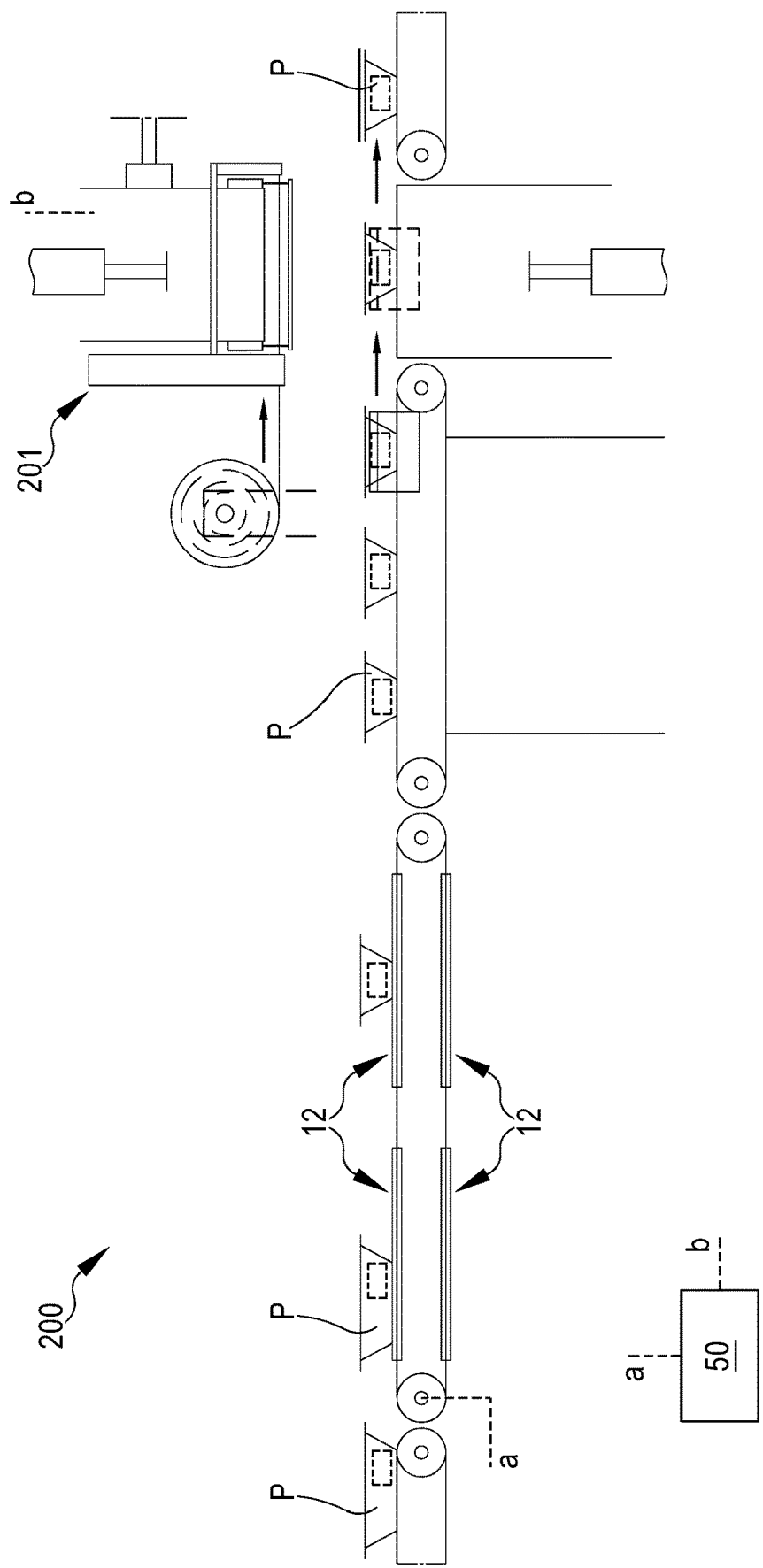
FIG. 22 is a schematic lateral view of a further embodiment of a packaging station comprising a conveyor according to aspects of the invention.

In order to allow insertion and extraction, when needed, of the pins 22 in the respective seats, the protrusions 25 of each given sub-element prevent extraction of the pin only when the interested sub-elements are coplanar (see for example FIG. 20E) or are not excessively inclined the one with respect to the other, while allowing extraction of the pin when the given sub-element and the adjacent sub-element are inclined the one with respect to the other of an angle greater than said prefixed acute angle (see FIGS. 20C and 20D).

As previously mentioned, each sub-element 17 also comprises an axial stop 24 for one first side portion 17c and an axial stop 24 for the adjacent second side portion 17d: in particular, the axial stops 24 are located at the same first and second side portion carrying the lock protrusion 25 in order to define a single corner block of one sub-element 17 comprising the two lock protrusions 25 and the two axial stops 24. Each axial stop 24 defines an axial abutment for the pin inserted in the coupling seat formed between two adjacent sub-elements, such that when the pin 22 is inserted it has one end abutting against the axial stop and the opposite end axially blocked by the protrusion 25 of a neighboring sub-element.

As mentioned at the beginning of the detailed description the sub-elements 17 are surrounded by perimeter bodies 18 (see FIGS. 7 and 8). In detail, each rotatable portion 12 comprises a plurality of perimeter bodies 18 defining a peripheral edge of the rotatable portion 12 encircling the plurality of interconnected sub-elements 17. Each one of the perimeter bodies 18 is connected with at least one of said sub-elements 17 and presents a radially external side 18a of curved shape. The perimeter bodies 18 are positioned in side by side relationship such that their external sides provide the rotatable portion with a peripheral edge of circular shape as the aperture 16 receiving the rotatable portion.

Figure 2:
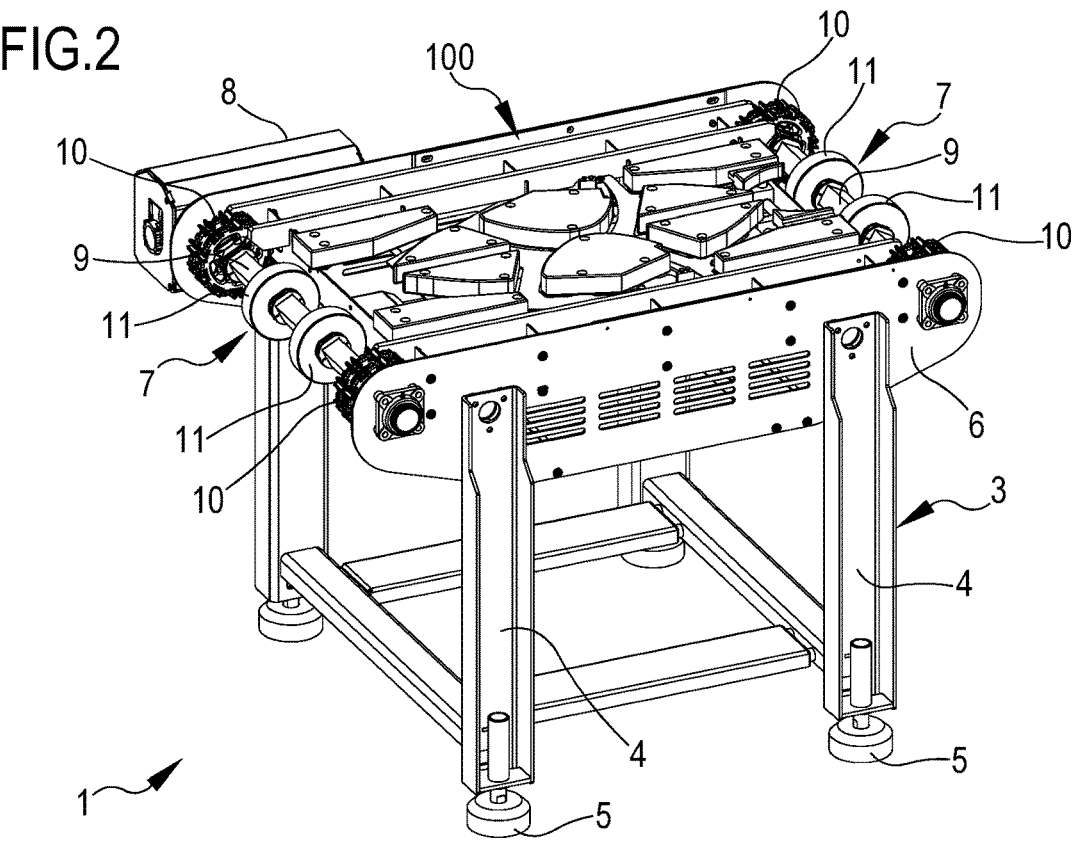
FIG. 2 shows the conveyor of FIG. 1 without the conveyor belt.

Finally, each rotatable portion 12 comprises one or more driving pieces 26 (in FIG. 8 the exemplifying rotatable portion 12 comprises four driving pieces 26 positioned 90° apart the one from the other) emerging from a bottom side of the rotatable portion 12. The driving pieces 26 may be carried by the perimeter bodies 18 of the rotatable portion. The driving pieces 26 are designed to cooperate with a passive or with an active control mechanism mounted on the frame 3. A passive control mechanism 100 is shown in FIGS. 2-4 and may for example comprise guides which cooperate with the driving pieces 26 and which cause movement of the driving pieces 26 and thus rotation of the rotatable portion 12 as a consequence of a movement imparted to the conveyor belt 2: more in detail the passive control mechanism 100 may be configured to act on said driving pieces and, following a pre-determined displacement of the conveyor belt body along said predetermined path, cause a rotation of the rotatable portion by 90° or multiples thereof. Alternatively, an active mechanism (not shown) may be used in place of the passive control mechanism and include one or more pneumatic, electric or hydraulic actuators acting on the driving pieces 26 and putting in rotation the rotatable portion 12 of the desired angle.

Here below possible embodiments of a passive control mechanism 100 usable for causing motion of the rotatable portions 12 is provided.

Figure 9:
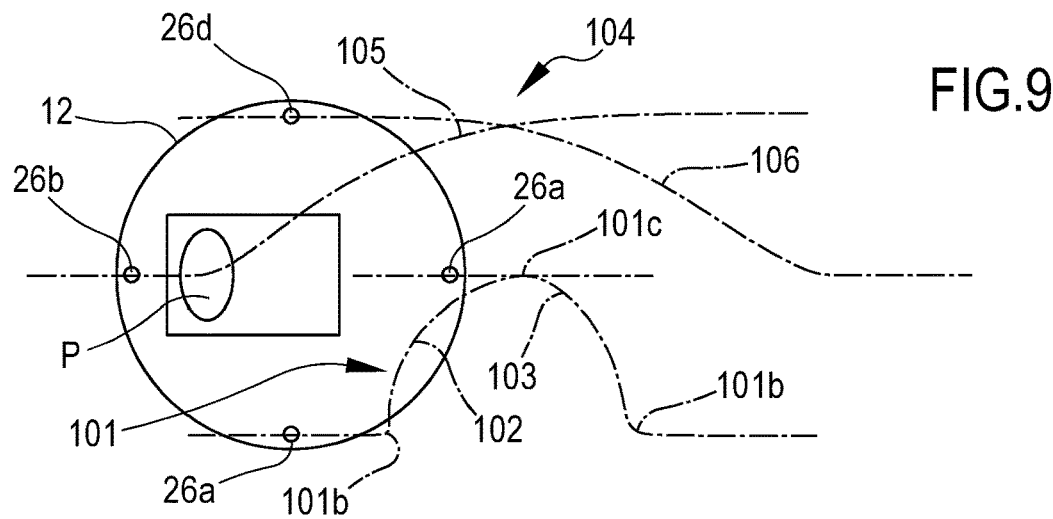
FIGS. 9-13 schematically show the trajectories taken by four driving pieces carried by the rotatable portion of the conveyor belt during subsequent phases of rotation of the rotatable portion.

As shown in FIGS. 2-4, the control mechanism 100 comprises at least one guide 101 developing on a plane parallel to the operative tract 2a of the conveyor belt 2 on which the articles P are moved along the advancement direction A. The guide 101 is particularly steep, as it will be explained here below, and extends along a predetermined operative path: the driving piece 26 is moved along the operating path of the steep guide 101 to cause rotation of the rotatable portion 12; in detail, the guide 101 is configured to drive the driving piece 26 along the predetermined operative path imposed by the same guide during displacement of the belt body 13 along said advancement direction A, thereby causing the rotation of the rotatable portion and thus of any article P carried by the rotatable portion: as guide 101 is steep, then rotation of the rotatable portion by 90° takes place as a consequence of a relatively short longitudinal run of piece 26. The operative path of the guide 101 exhibits, for at least of a tract of the path, a parabolic curve joining two consecutive straight tracts: the parabolic curve is steep in the sense that an ideal straight line joining the two ends of the parabolic curve would be inclined by more than 30°, for example by more than 45°; on the other hand thanks to its parabolic shape, the guide 101 allows the gentle movement of the driving piece 26 in order to gradually impose the rotation on the rotatable portion 12. As described above, the driving piece 26 is located at a peripheral edge of the rotatable portion 12; this configuration allows the guide 101, following a predetermined displacement of the belt body 13 along said advancement direction A, to cause the rotation of the rotatable portion 12 by 90° or multiples thereof. More in detail, the guide 101 extends between a first and a second end portion 101b, 101c: the first end portion 101b of the guide 101 extends underneath the peripheral edge of the rotatable portion 12 while the second portion 101c of the guide 101 extends underneath a central portion of the rotatable portion 12 (see FIG. 9).

Figure 10:
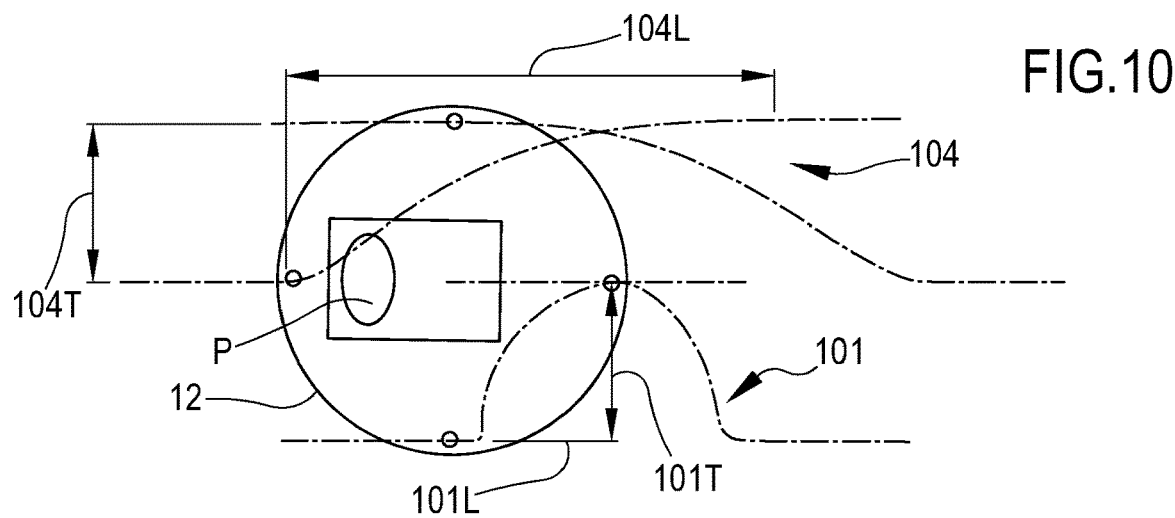
Figure 11:
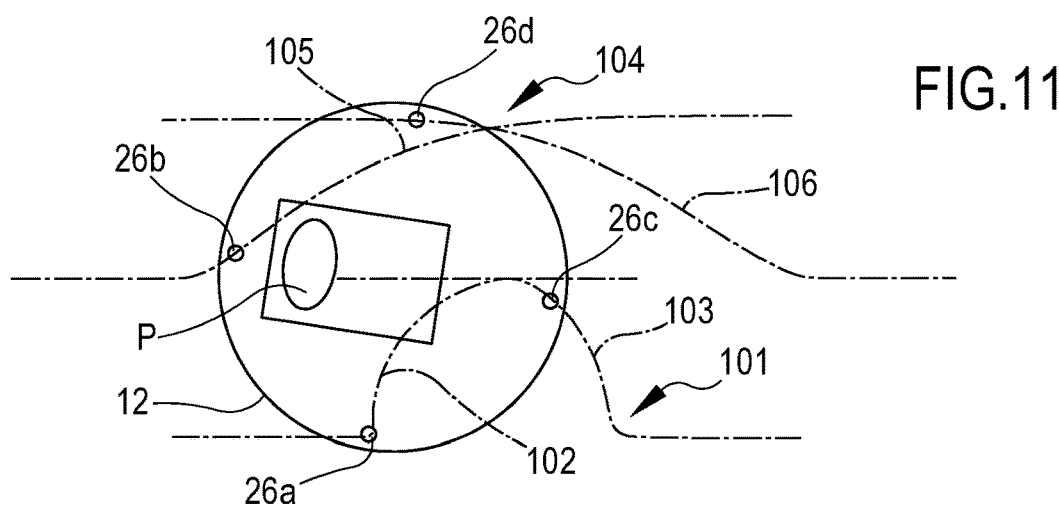
Figure 12:
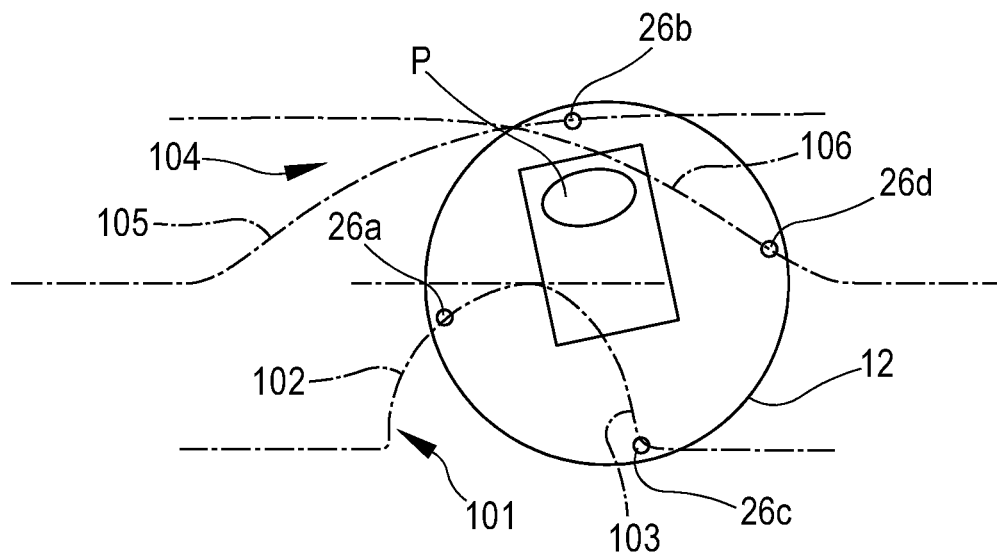
Figure 13:
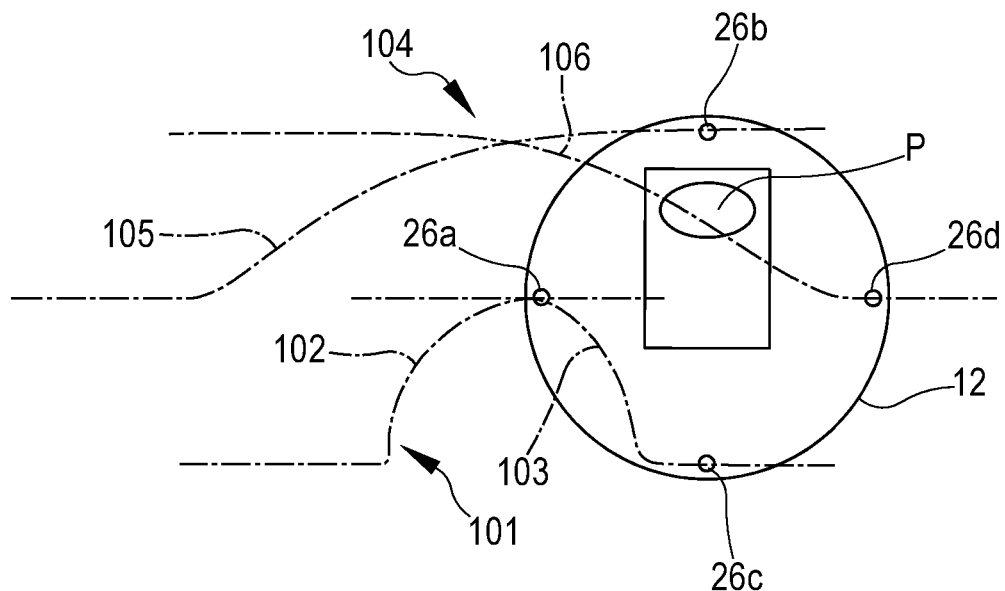

In term of size, the guide 101 exhibits a transverse extension $101_T$, measured along a direction perpendicular to the advancement direction A, greater than 75%, optionally greater than 100%, of a longitudinal extension $101_L$ of the same guide measured parallel to the advancement direction A (see FIG. 10); in particular, the ratio between the transversal extension $101_T$ and the longitudinal extension $101_L$ of the guide 101 is equal to or greater than 0.75, more precisely greater than 1.1, optionally comprised between 1.1 and 2, more optionally comprised between 1.1 and 1.5. FIG. 10 shows the operative path of the guide 101; to better visualize the transverse and longitudinal dimensions of the guide 101, as well as the mentioned ratios, references $101_L$ and $101_T$ are schematically reported in FIG. 10.

Also the rotatable portion 12 exhibits a predetermined transversal size measured perpendicularly to the advancement direction A; the transversal extension $101_T$ of the guide 101 is substantially half the predetermined transversal size of the rotatable portion 12 (see the schematic representations reported on FIGS. 9-13). In detail, the ratio between the longitudinal extension $101_L$ of the guide 101 and the transversal size of the rotatable portion 12 is less than 0.6, optionally is less than 0.5, more optionally is comprised between 0.4 and 0.2.

As shown in FIG. 9-13, the control mechanism 100 may comprise either a single steep guide 101 as described above or a first and second guide 102, 103 (both relatively steep in the sense described above for the guide 101) aligned along a longitudinal direction parallel to the advancement direction A. The first guide 102 extends along a first operative path while the second guide 103 extends along a respective second operative path. Each of said first and second guides 102, 103 presents structure and geometry similar to the just described guide 101 in terms of steepness, longitudinal extension, transversal extension, ratio between the transversal extension and the longitudinal extension and ratios between the longitudinal extension or transversal extension of each guide 102, 103 and the transversal size of the rotatable portion 12.

As shown in FIGS. 9-13, the first and second guide 102, 103 exhibit respective parabolic profiles defining respective concavities: the concavities of the first and second guide 102, 103 face each other such that one extends in prosecution of the other. In detail, the operative paths of the first and second guide 102, 103 may converge toward a common end point. More in detail, the first and second guide 102, 103 are symmetrical with respect to a direction perpendicular to the advancement direction A.

In the case, as in the embodiments shown, the control mechanism 100 comprises two steep guides, namely the first and the second guides 102, 103, then the rotatable portion 12 comprises two driving pieces 26, each of which during a same rotation of the rotatable portion 12, is configured to cooperate with the respective of said first and second guide 102, 103.

The control mechanism 100 may further comprise one auxiliary guide 104 (significantly less steep compared to the guide 101 and the first and second guides 102, 103) developing on a plane parallel to the operative tract 2a of the conveyor belt 2 and extending along a respective predetermined operative path; also the auxiliary guide 104 is configured to cooperate with a respective driving piece 26 and, together with the guide 101 (or together with the first and second guides 102, 103 in case two), rotate the portion 12 of the conveyor belt, following the displacement of the belt body 13 along said advancement direction A.

The control mechanism 100 may comprise exclusively one (relatively steep) guide 101 and one auxiliary guide 104 (significantly less steep than guide 101); in this configuration the rotatable portion 12 comprises different driving pieces as described below, namely:
  at least a first driving piece 26a emerging from the bottom surface 55 of the rotatable portion 12; the guide 101 is configured to drive the first driving piece 26a along its predetermined operative path following the displacement of the belt body 13 along said advancement direction A, causing the rotation of the article P,
  at least a second driving piece 26b, emerging from the bottom surface 55 of the rotatable portion 12, positioned at least 90° apart the first driving piece 26a. The auxiliary guide 104 is configured to drive the second driving piece 26b along its respective predetermined operative path following the displacement of the belt body 13 along said advancement direction A, causing the rotation of the article P.

In a further embodiment, the control mechanism 100 may comprises the first and second guide 102, 103 (parabolic guide with a transversal extension greater than a longitudinal extension) and the auxiliary guide 104 or two distinct first and second auxiliary guides 105, 106. In this configuration, the rotatable portion 12 may comprise three or four distinct and spaced driving pieces 26 each of which is configured cooperate with the respective guide (102, 103, 104 or 102, 103, 105, 106) in order to rotate the portion 12 around the axis R.

As shown in FIGS. 9-13 the auxiliary guide 104 is distinct and spaced with respect the guide 101; in particular, the auxiliary guide 104 is spaced from the guide 101 with respect to a direction perpendicular to the advancement direction A. in detail, the auxiliary guide 104 is spaced from the guide 101 (or the first and second guide 102, 103) with respect to a direction perpendicular to the advancement direction A and to a direction parallel to the advancement direction A. In the examples shown, the guide 101 (or the first and second guides 102, 103) extends underneath a transversal half of the belt body 13 while the auxiliary guide 104 extends underneath the other transversal half of the belt body 13. Also the auxiliary guide 104 exhibits a predetermined operative path having, for at least of a tract of said path, a curved profile having a respective concavity; the concavity of the guide 101, if present the concavity of the first and second guides 102, 103, and the concavity of guide 104 are all oriented towards the same lateral edge of the belt body 13.

Concerning dimensions, the auxiliary guide 104 exhibits a longitudinal extension $104_L$, measured parallel to the advancement direction A, greater than a transversal extension $104_T$ of the same guide measured perpendicularly to the advancement direction A. In detail, the ratio between the longitudinal extension $104_L$ and the transversal extension $104_T$ of the auxiliary guide 104 is greater than 1.5, optionally equal or greater than 2, more optionally comprised between 2 and 4. In particular, the ratio between the longitudinal extension $104_L$ of the auxiliary guide 104 and the transversal size of the rotatable portion 12 is comprised between 0.8 and 1.2, optionally the longitudinal extension $104_L$ of the auxiliary guide 104 is equal to the transversal size of the rotatable portion 12 (see FIG. 10).

As shown in FIG. 9-13, the control mechanism 100 comprises instead of a single auxiliary guide 104 two auxiliary guides as follows:
  at least one first auxiliary guide 105 extending along a first operative path,
  at least a second auxiliary guide 106 extending along a second operative path, intersecting the first operative path of the first auxiliary guide.

Each of said first and second auxiliary guides 105, 106 presents structure and geometry similar to the just described auxiliary guide 104 in terms of steepness (which is significantly smaller than that of guides 101, 102, 103), longitudinal extension, transversal extension, ratio between the transversal extension and the longitudinal extension and ratios between the longitudinal extension or transversal extension of each auxiliary guide 105, 106 and the transversal size of the rotatable portion 12.

As shown in FIGS. 9-13, each one of said first and second auxiliary guides 105, 106 exhibit respective curved profiles defining respective concavities: the concavities of said first and second auxiliary guides 105, 106 face each other. In detail, the operative paths of the first and second auxiliary guide 105, 106 are symmetrical with respect to a direction perpendicular to the advancement direction A.

In one embodiment shown in FIGS. 9-13, the control mechanism may comprises four driving pieces (26a, 26b, 26c, 26d) positioned 90° apart the one from the other emerging from the bottom surface 55 of the rotatable portion 12; each driving piece is configured to cooperate with one of the guides between:
  the first guide 102,
  the second guide 103,
  the first auxiliary guide 105,
  the second auxiliary guide 106.

The first and second guides 102, 103 together with the first and second auxiliary guides 105, 106, following the displacement of the belt body 13 along said advancement direction A, are configured to cooperate simultaneously with the four driving pieces (26a, 26b, 26c, 26d) of the rotatable portion 12, causing the rotation of this latter.

From a structural perspective, each one of the above described guides and auxiliary guides of the control mechanism 100 may be defined by means of appropriate raceways carried by a base plate 120 borne on top of frame 3 and extending parallel to and below the operative tract 2a of the conveyor.

In the example shown in FIGS. 2-4, the raceways defining the guides 101 or 102, 103 and the auxiliary guides 104 or 105 and 106 are formed by the sides of a plurality of longitudinally adjacent blocks emerging from the base plate 120. In practice the internal or external sides (internal sides being the sides closer to the longitudinal center axis of the conveyor) of the adjacent blocks combine to form the various guides as described herein below in greater detail. In particular, referring to FIG. 4 and moving from left to right the base plate 120 carries two opposite sliding blocks 140, 145 (serving as deviators for the pieces 26), followed by two fixed (almost triangular) and symmetrically opposed proximal blocks 122, followed by two fixed and symmetrically opposed central blocks 123, which are then followed by two also fixed and symmetrically opposed terminal blocks 124. At the longitudinal opposite ends of the base plate 120, two symmetrically opposed inlet guide blocks 125 and two symmetrically opposite outlet guide blocks 126 are also present. Finally, immediately adjacent to each one of the central blocks 123, a respective activating element 130, 135 is positioned which serves to selectively deviate the trajectory of the pieces 26 as it will be hereinafter described.

In practice, with reference to FIGS. 4 and 9-13, a piece 26a travelling along trajectory of guide 102, passes on the external side of the inlet guide block 125 (the inferior inlet guide block 125 in FIG. 4) and is intercepted by activating element 130, which may be activated (and thus moved vertically upwards) by a mechanical actuator, such as a spring, or by an hydraulic, pneumatic or electric actuator. The activating element 130 moves the piece 26a on the internal side profile of the central block 123 (the inferior central block 123 in FIG. 4) and then proceed straight moving between the two distal blocks 124.

Piece 26b of same rotating plate 12, which is spaced 90° a part in a counterclockwise direction with respect to piece 26a and which is travelling along trajectory of first auxiliary guide 105, passes on the internal side of sliding block 140, which has been horizontally displaced (by a mechanical or pneumatic or electric or hydraulic actuator) such as to align its internal side to the external side of block 122 (the upper block 122 in FIG. 4). Then pin 26b moves on the external side of block 122 and of central block 123 to then reach the external side of outlet guide block 126 (the upper outlet guide block 126 in FIG. 4) where the piece 26b takes a straight trajectory.

Piece 26c of same rotating plate 12, which is spaced 90° a part in a clockwise direction with respect to piece 26a and which is travelling along trajectory of second guide 103 is positioned on the front of the rotating element (see FIGS. 9 and 10) when the pieces 26a and 26b are about to follow the above described trajectories 102 and 105 respectively. Note that to reach the position shown in FIG. 10, piece 26c had to travel straight between the straight internal facing sides of the two proximal blocks 122. Then piece 26c mounts on the external side of central block 123 to then reach the external side of outlet guide block 126 (the lower outlet guide block 126 in FIG. 4) where the piece 26c takes a straight trajectory.

Finally, piece 26d of the same rotating 12 which is angularly spaced by 180° with respect to piece 26a and which follows the trajectory of the second auxiliary guide 106 slides first on the external side inlet guide block 125 (the superior inlet guide block 125 in FIG. 4) and is then intercepted by activating element 135, which may be activated (and thus selectively moved vertically upwards) by a mechanical actuator, such as a spring, or by an hydraulic, pneumatic or electric actuator. The activating element 135 moves piece 26d on the internal side profile of the central block 123 (the superior central block 123 in FIG. 4); then piece 26d proceed straight moving between the two distal blocks 124.

The above described operation causes a 90° clockwise angular motion of the rotatable portion as it is visible from FIGS. 9-13. However, as two opposite sliding blocks 140, 145, the opposed proximal blocks 122, the opposed central blocks 123, the opposed terminal blocks 124, the opposed inlet guide blocks 125, the opposed guide blocks 126, and the activating elements 130, 135 are symmetrically opposed in pairs it is possible to operate appropriately on the activating elements and on the sliding blocks to impose to the pieces 26a, 26b, 26c, 26d trajectories which are symmetric to those described above thus resulting in a counterclockwise motion of the rotatable portion by 90°.

In accordance with a further aspect, it is provided a packaging apparatus comprising the conveyor described above and a sealing station; the conveyor is configured to convey articles to be packaged to the sealing station and the sealing station is configured to apply a sealing film to the products to be packaged. A control unit is configured to synchronize movement of the conveyor with the sealing process performed by the sealing station.

Operation of the conveyor 1 is as follows.

Motor 8 causes motion of the conveyor belt 2. As shown in FIG. 1, as a consequence of the translation motion of the top stretch of the conveyor belt 2, the passive control mechanism 100 acts on driving piece or pieces 26 and cause a controlled rotation of the rotatable portion 12 by e.g., 90°. It should be noted that by virtue of its specific design, the rotatable portion has transversally aligned sub-elements which form rows Ro and lines Li of sub-elements (see FIG. 6), which may bend and follow the non-linear path of the belt body: for example referring to FIG. 5, it should be noted that each rotatable portion 12 is capable of bending when the segment of conveyor carrying the rotatable portion turns around one of the turning assemblies 7. Additionally, the conveyor belt body may be either formed in a deformable material or comprise bands of rigid material (schematically identified with reference numeral 13a in FIG. 5 having width W identical to the conveyor belt width and extension E in the direction of conveyor belt motion which is equal to the width of each one of the rows or lines formed by the sub-elements 17.

The invention claimed is:

1. A conveyor (1) comprising
   a support frame (3),
   a conveyor belt (2), carried by the support frame (3), configured to move at least one article (P) along an advancement direction (A) on a planar operative tract (2a), said conveyor belt (2) comprising:
   a belt body (13),
   at least one rotatable portion (12) coupled to the belt body (13) and configured to turn relative to the belt body (13),
   wherein the rotatable portion (12) has a top surface (15) configured to receive said article (P), the rotatable portion (12), during the movement of the article (P) along the advancement direction (A), being configured to turn relative to the belt body (13) at least between two angularly offset positions, wherein the rotatable portion (12) comprises at least one driving piece (26) emerging from a bottom surface (55) of the rotatable portion (12) opposite to said top surface (15),
a control mechanism (100) carried by the support frame (3), the control mechanism being configured to act on said driving piece (26) and, following a displacement of the belt body (13) along said advancement direction (A), cause a rotation of the rotatable portion (12) between said two angularly offset positions,
characterized by the fact that the control mechanism (100) comprises at least one guide (101) developing on a plane parallel to the operative tract (2a) of the conveyor belt (2) and extending along a predetermined operative path, said guide (101) being configured to drive the driving piece (26) along the predetermined operative path during displacement of the belt body (13) along said advancement direction (A), causing the rotation of the article (P),
wherein the guide (101) exhibits a transverse extension (101T), measured along a direction perpendicular to the advancement direction (A), greater than 0.75 of a longitudinal extension (101L) of the same guide measured parallel to the advancement direction (A).

2. The conveyor according to claim 1, wherein the ratio between the transversal extension (101T) and the longitudinal extension (101L) of the guide (101) is between 1.1 and 2.

3. The conveyor according to claim 1, wherein the guide (101) of the control mechanism (100) is configured to act on said driving piece (26) and, following a predetermined displacement of the belt body (13) along said advancement direction (A), cause a rotation of the rotatable portion (12) by 90° or multiples thereof.

4. The conveyor according to claim 1, wherein the rotatable portion (12) exhibits a predetermined transversal size measured perpendicularly to the advancement direction (A),
wherein the transversal extension (101T) of the guide (101) is substantially half the predetermined transversal size of the rotatable portion (12).

5. The conveyor according to claim 1, wherein the ratio between the longitudinal extension (101L) of the guide (101) and the transversal size of the rotatable portion (12) is less than 0.6.

6. The conveyor according to claim 1, wherein the operative path of the guide (101) exhibits, for at least of a tract of the path, a parabolic curve.

7. The conveyor according to claim 1, wherein:
the guide (101) extends between a first and a second end portion (101b, 101c),
the first end portion (101b) of the guide (101) extends underneath the peripheral edge of the rotatable portion (12),
the second portion (101c) of the guide (101) extends underneath a central portion of the rotatable portion (12),
wherein the guide (101) cooperates with the driving piece (26) and, following a displacement of the belt body (13) along said advancement direction, cause a rotation of the rotatable portion (12) by 90° or multiples thereof.

8. The conveyor according to claim 1, wherein the control mechanism (100) further comprises at least one auxiliary guide (104) developing on a plane parallel to the operative tract (2a) of the conveyor belt (2) and extending along a respective predetermined operative path, wherein the auxiliary guide (104) exhibits a longitudinal extension (104L), measured parallel to the advancement direction (A), greater than a transversal extension (104T) of the same guide measured perpendicularly to the advancement direction (A),
wherein the control mechanism (100) includes:
at least a first driving piece (26a) emerging from the bottom surface (55) of the rotatable portion (12), the guide (101) being configured to drive the first driving piece (26a) along its predetermined operative path following the displacement of the belt body (13) along said advancement direction (A), causing the rotation of the article (P),
at least a second driving piece (26b), emerging from the bottom surface (55) of the rotatable portion (12), positioned at least 90° apart the first driving piece (26a), said auxiliary guide (104) being configured to drive the second driving piece (26) along its respective predetermined operative path during the displacement of the belt body (13) along said advancement direction (A), causing the rotation of the article (P).

9. The conveyor according to claim 8, wherein the control mechanism is configured such that the auxiliary guide (104) engages the second driving piece (26b) before the first driving piece (26) engages said guide (101).

10. The conveyor according to claim 8 or 9, wherein the ratio between the longitudinal extension (104L) and the transversal extension (104T) of the auxiliary guide (104) is greater than 1.5 and the ratio between the longitudinal extension (104L) of the auxiliary guide (104) and the transversal size of the rotatable portion (12) is comprised between 0.8 and 1.2.

11. The conveyor according to claim 8, wherein the belt body presents two longitudinally adjacent transversal halves, and wherein the guide (101) extends underneath one of the two transversal halves of the belt body (13) while the auxiliary guide (104) extends underneath the other of the two transversal halves of the belt body (13).

12. The conveyor according to claim 8, wherein the respective predetermined operative path of the auxiliary guide (104) defines, for at least of a tract of said path, a curved profile,
wherein the curved profile of the predetermined operative path of the guide (101) has a pre-determined concavity oriented towards a lateral edge of the belt body (13), wherein the curved profile of the respective operative path of the auxiliary guide (104) has a respective concavity oriented towards the same lateral edge of the belt body (13).

13. The conveyor according to claim 1, wherein said control mechanism (100) comprises:
at least one first guide (102) extending along a first operative path,
at least a second guide (103) extending along a second operative path,
wherein each one of said first and second guides (102, 103) exhibits a substantially curved profile with concavity directed to the same side,
wherein the operative paths of the first and second guide (102, 103) join at a common end point and are substantially symmetrical with respect to a direction perpendicular to the advancement direction (A).

14. The conveyor according to claim 8, wherein the control mechanism comprises:
at least one first auxiliary guide (105) extending along a first operative path,
at least a second auxiliary guide (106) extending along a second operative path,
wherein the first operating path of the first auxiliary guide intersects with the second operating path of the second auxiliary guide, wherein the rotatable portion (12) comprises four driving pieces (26a, 26b, 26c, 26d) positioned 90° apart the one from the other and emerging from the bottom surface (55) of the rotatable portion (12), each driving piece is configured to cooperate with one of the guides between:
- the first guide (102),
- the second guide (103),
- the first auxiliary guide (105),
- the second auxiliary guide (106);

the first and second guides (102, 103) together with the first and second auxiliary guides (105, 106), during the displacement of the belt body (13) along said advancement direction (A), are configured to cooperate with the four driving pieces (26a, 26b, 26c, 26d) of the rotatable portion (12), causing rotation of this latter.

15. The conveyor according to claim 1, wherein the belt body (13) has a top surface (14) positions in alignment with the top surface (15) of the rotatable portion (12), wherein the belt body (13) has an aperture (16) configured for receiving the rotatable portion (12), wherein the belt body aperture is shaped as the peripheral edge of the rotatable portion (12).

16. The conveyor according to claim 1, the frame (3) extends along a first and second opposite longitudinal ends (1a, 1b), the frame (3) supports a turning assembly (7) at each of said first and second longitudinal ends of the conveyor (1), the conveyor belt (2) being engaged around the two turning assemblies (7) and configured according to a closed loop thereby forming an endless conveyor belt (2), wherein at least one of the turning assemblies (7) is connected to a motor (8) in order to receive rotational power from the motor (8) and turn it into advancement movement of the conveyor belt (2).

17. The conveyor according to claim 1, the rotatable portion (12) is engaged to a belt body (13) segment such that when this belt body segment is planar also the associated rotating portion (12) is planar but can turn relatively to the belt body (13) according to a rotation axis (R) perpendicular to the belt body segment.

18. The conveyor according to claim 1, wherein the control mechanism (100) comprises:
- a base plate (120) parallel to the operative tract (2a) of the conveyor belt (2),
- a plurality of longitudinally adjacent blocks (122, 123, 124, 125, 126) emerging from the base plate (120) having sides which form the first and second guides and/or the first and second auxiliary guides,
- one or more activating elements (130, 135) cooperating with one the longitudinally adjacent blocks and selectively serving to deviate the trajectory of pieces (26) interacting with the control mechanism (100);

wherein said activating element or each one of said activating elements (130, 135) is movable along a direction perpendicular to the operative tract (2a) of the conveyor belt (2) at least between:
- one lower position in which it is configured to allow undisturbed passage of the driving piece (26),
- one upper position in which it is configured to contact the driving piece and direct it onto the respective guide.

19. The conveyor according to claim 1, wherein the control mechanism (100) comprises:
- at least one sliding block (140) relatively movable with respect the support frame (3) and configured to guide the driving piece (26) into one auxiliary guide, wherein the sliding block (140) is movable along an horizontal direction parallel to the operative tract (2a) of the conveyor belt (2) and perpendicular with respect the advancement direction (A) at least between:
- one inactive position in which sliding block allows undisturbed passage of the driving piece (26),
- one active position in which the sliding block directs the driving piece into the respective auxiliary guide.

20. A packaging apparatus (200) comprising:
- at least one conveyor (1); and
- at least one sealing station (201) configured to apply a sealing film to the article to be packaged;

the at least one conveyor comprising:
- a support frame (3),
- a conveyor belt (2), carried by the support frame (3), configured to move at least one article (P) along an advancement direction (A) on a planar operative tract (2a), said conveyor belt (2) comprising:
  - a belt body (13),
  - at least one rotatable portion (12) coupled to the belt body (13) and configured to turn relative to the belt body (13), wherein the rotatable portion (12) has a top surface (15) configured to receive said article (P), the rotatable portion (12), during the movement of the article (P) along the advancement direction (A), being configured to turn relative to the belt body (13) at least between two angularly offset positions, wherein the rotatable portion (12) comprises at least one driving piece (26) emerging from a bottom surface (55) of the rotatable portion (12) opposite to said top surface (15),
- a control mechanism (100) carried by the support frame (3), the control mechanism being configured to act on said driving piece (26) and, following a displacement of the belt body (13) along said advancement direction (A), cause a rotation of the rotatable portion (12) between said two angularly offset positions, characterized by the fact that the control mechanism (100) comprises at least one guide (101) developing on a plane parallel to the operative tract (2a) of the conveyor belt (2) and extending along a predetermined operative path, said guide (101) being configured to drive the driving piece (26) along the predetermined operative path during displacement of the belt body (13) along said advancement direction (A), causing the rotation of the article (P), wherein the guide (101) exhibits a transverse extension (101T), measured along a direction perpendicular to the advancement direction (A), greater than 0.75 of a longitudinal extension (101L) of the same guide measured parallel to the advancement direction (A).

* * * * *